US012471101B2

United States Patent
Ma et al.

(10) Patent No.: US 12,471,101 B2
(45) Date of Patent: Nov. 11, 2025

(54) RESOURCE DETERMINING METHOD AND APPARATUS

(71) Applicant: Huawei Technologies Co., Ltd., Shenzhen (CN)

(72) Inventors: Ruixiang Ma, Shenzhen (CN); Lei Guan, Beijing (CN); Yongxia Lyu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 840 days.

(21) Appl. No.: 17/738,952

(22) Filed: May 6, 2022

(65) Prior Publication Data

US 2022/0264629 A1 Aug. 18, 2022

Related U.S. Application Data

(63) Continuation of application No. PCT/CN2019/116723, filed on Nov. 8, 2019.

(51) Int. Cl.
*H04W 72/23* (2023.01)
*H04L 1/1607* (2023.01)

(52) U.S. Cl.
CPC ........... *H04W 72/23* (2023.01); *H04L 1/1671* (2013.01)

(58) Field of Classification Search
CPC .............................. H04W 72/23; H04L 1/1671
See application file for complete search history.

(56) References Cited

U.S. PATENT DOCUMENTS

| 2013/0034073 | A1 | 2/2013 | Aiba et al. |
| 2018/0375697 | A1 | 12/2018 | Chen et al. |
| 2019/0289622 | A1 | 9/2019 | Chatterjee et al. |
| 2019/0313436 | A1 | 10/2019 | Lee et al. |
| 2020/0295903 | A1* | 9/2020 | Faxér ............... H04L 5/0055 |

FOREIGN PATENT DOCUMENTS

| CN | 109906576 A | 6/2019 |
| WO | 2018230911 A1 | 12/2018 |
| WO | 2019069234 A1 | 4/2019 |

OTHER PUBLICATIONS

R1-1809776 "Summary for DL/UL data scheduling maintenance" Qualcomm 3GPP WG1 #94 Gothenburg, Sweden Aug. 20-24, 2018 (Year: 2018).*
"Remaining details on UE processing times and HARQ operation," 3GPP TSG RAN WG1 Meeting #92, Athens, Greece, R1-1803265, Total 12 pages, 3rd Generation Partnership Project, Valbonne, France (Feb. 26-Mar. 2, 2018).

(Continued)

*Primary Examiner* — Basil Ma
(74) *Attorney, Agent, or Firm* — Leydig, Voit & Mayer, Ltd.

(57) ABSTRACT

A resource determining method and an apparatus are disclosed. A network device determines a resource of an uplink channel. A terminal device receives downlink control information (DCI) sent by the network device, where the DCI is carried on a physical downlink control channel (PDCCH). The terminal device determines the resource of the uplink channel based on the DCI, where the resource of the uplink channel is used to send uplink information. As a result, a latency of sending the uplink information is reduced.

10 Claims, 6 Drawing Sheets

(56) References Cited

OTHER PUBLICATIONS

"3rd Generation Partnership Project; Technical Specification Group Radio Access Network; NR; Physical layer procedures for control (Release 15)," 3GPP TS 38.213 V15.7.0, pp. 1-108, 3rd Generation Partnership Project, Valbonne, France (Sep. 2019).
"Summary for DL/UL data scheduling maintenance," 3GPP TSG-RAN WG1 Meeting #94, Gothenburg, Sweden, R1-1809776, Total 16 pages, 3rd Generation Partnership Project, Valbonne, France (Aug. 20-24, 2018).
"3rd Generation Partnership Project; Technical Specification Group Radio Access Network; NR; Radio Resource Control (RRC) protocol specification (Release 15)," 3GPP TS 38.331 V15.7.0, pp. 1-527, 3rd Generation Partnership Project, Valbonne, France (Sep. 2019).

* cited by examiner

RESOURCE DETERMINING METHOD AND APPARATUS

CROSS-REFERENCE TO RELATED APPLICATIONS

This application is a continuation of International Application No. PCT/CN2019/116723, filed on Nov. 8, 2019, the disclosure of which is hereby incorporated by reference in its entirety.

TECHNICAL FIELD

This application relates to communication technologies, and in particular, to a resource determining method and an apparatus.

BACKGROUND

Compared with previous generations of mobile communication systems, a 5G communication system imposes higher requirements on a transmission rate, a latency, power consumption, and the like. Ultra-reliable and low-latency communication (URLLC) is one of typical services of 5G communication, and specific requirements of the ultra-reliable and low-latency communication include: Data transmission reliability reaches 99.999%, a transmission latency is less than 1 ms, and instruction overheads is reduced as much as possible while requirements for high reliability and a low latency are satisfied. Therefore, how to ensure the reliability and the low latency of URLLC becomes a problem of great concern in the art.

To support the URLLC service, carrier aggregation (CA) may be performed on frequency range (FR) labelled FR1 and FR2, to increase a system capacity. In a CA scenario, a carrier on which uplink information is sent is indicated by a network device in advance. However, if a terminal device cannot send the uplink information in time by using an uplink resource indicated in advance, it is quite difficult to ensure the reliability and the low latency of the URLLC service.

SUMMARY

This application provides a resource determining method and an apparatus, to reduce a latency of sending uplink information.

According to a first aspect, this application provides a resource determining method, including:

receiving downlink control information DCI sent by a network device, where the DCI is carried on a physical downlink control channel PDCCH; and determining a resource of an uplink channel based on the DCI, where the resource of the uplink channel is used to send uplink information.

In a possible implementation, after the determining a resource of an uplink channel based on the DCI, the method further includes: determining first processing duration, where the first processing duration includes at least one time unit; and when feedback duration is greater than or equal to the first processing duration, sending the uplink information on the resource of the uplink channel, where the feedback duration is a time length between the resource of the uplink channel and a resource of a downlink channel corresponding to the uplink channel, and the downlink channel includes the PDCCH or a physical downlink shared channel PDSCH scheduled by using the DCI.

In a possible implementation, the determining first processing duration includes: obtaining at least one subcarrier spacing SCS and processing duration respectively corresponding to the at least one SCS, where the at least one SCS includes an SCS of the PDCCH and an SCS of the uplink channel; and determining shortest duration in the processing duration respectively corresponding to the at least one SCS as the first processing duration.

Both the network device and a terminal device use the shortest duration as processing duration of the terminal device. Therefore, the feedback duration may be set to be a value greater than or equal to the processing duration. For example, the feedback duration may be a value slightly greater than the processing duration. Because the processing duration is the shortest, the terminal device sends, as soon as possible, the uplink information on an uplink channel corresponding to a time unit indicated by the feedback duration, to reduce a latency of sending the uplink information.

In a possible implementation, the at least one SCS further includes an SCS of the PDSCH scheduled by using the DCI, the uplink channel is a physical uplink control channel PUCCH, and the PUCCH carries feedback information corresponding to the PDSCH.

In a possible implementation, the at least one SCS further includes an SCS of a channel state information-reference signal CSI-RS, the uplink channel is a PUCCH or a PUSCH, the PUCCH or the PUSCH carries channel state information CSI corresponding to the CSI-RS, and the CSI is triggered by the DCI.

In a possible implementation, the uplink channel is a PUSCH scheduled by using the PDCCH.

In a possible implementation, the determining first processing duration includes: obtaining an SCS of the PDSCH scheduled by using the DCI and processing duration corresponding to the SCS of the PDSCH, where the PDSCH corresponds to the uplink channel, the uplink channel is a PUCCH, and the PUCCH carries feedback information corresponding to the PDSCH; and determining the processing duration corresponding to the SCS of the PDSCH as the first processing duration.

In a possible implementation, the determining first processing duration includes: obtaining an SCS of a CSI-RS and processing duration corresponding to the SCS of the CSI-RS, where the CSI-RS corresponds to the uplink channel, the uplink channel is a PUCCH or a PUSCH, the PUCCH or the PUSCH carries CSI corresponding to the CSI-RS, and the CSI is triggered by the DCI; and determining the processing duration corresponding to the SCS of the CSI-RS as the first processing duration.

Processing duration corresponding to an SCS of the downlink channel is determined as the processing duration. When the SCS corresponding to the downlink channel is larger, the processing duration corresponding to the SCS is shorter. The processing duration corresponding to the SCS is used. That is, shorter feedback duration can be used to satisfy a condition of being greater than or equal to the processing duration. This reduces a latency of sending the uplink information by a terminal device. When the SCS corresponding to the downlink channel is smaller, although the processing duration corresponding to the SCS is longer, because the SCS is used for the downlink channel, it indicates that processing time of the downlink channel should be longer. In other words, data carried on the downlink channel is not so urgent. In this case, using the SCS to determine a processing capability does not affect the latency.

In a possible implementation, before the determining first processing duration, the method further includes: determining whether a first condition is satisfied; and the determining first processing duration includes: when the first condition is satisfied, determining the first processing duration, where the first condition includes: a current service is a URLLC service; or a value of first indication information is a specified value.

In a possible implementation, the uplink channel is a PUCCH, and the PUCCH carries feedback information corresponding to a PDSCH scheduled by using the DCI; and the determining a resource of an uplink channel based on the DCI includes: determining a carrier on which the PUCCH is located; and determining a resource of the PUCCH based on the carrier on which the PUCCH is located and the DCI.

In the method, the carrier on which the uplink channel is located may be dynamically determined, and a terminal device may choose, during each time of scheduling, to send the feedback information on a fastest available carrier, to reduce a service latency.

In a possible implementation, the determining a carrier on which the PUCCH is located includes: when the DCI includes second indication information, determining a carrier corresponding to a value of the second indication information as the carrier on which the PUCCH is located; when the DCI includes feedback duration, if a time unit that is indicated by the feedback duration and that is of the feedback information corresponding to the PDSCH includes a downlink symbol, determining a default carrier as the carrier on which the PUCCH is located; when the DCI includes the resource of the PUCCH, determining a carrier of the resource of the PUCCH as the carrier on which the PUCCH is located; determining, based on a bit quantity of the feedback information, the carrier on which the PUCCH is located, where there is a correspondence between a plurality of bit quantities of the feedback information and a plurality of PUCCH resource sets, and there is a correspondence between the plurality of PUCCH resource sets and a plurality of carriers; or determining, based on a service type of the PDSCH, the carrier on which the PUCCH is located, where there is a correspondence between a plurality of service types of the PDSCH and a plurality of carriers.

In a possible implementation, the determining a resource of the PUCCH based on the carrier on which the PUCCH is located and the DCI includes: obtaining a feedback duration set corresponding to the carrier on which the PUCCH is located, where there is a correspondence between the plurality of carriers and a plurality of feedback duration sets; and determining a time unit indicated by first feedback duration in the feedback duration set corresponding to the carrier on which the PUCCH is located as a time unit in which the PUCCH is located, where the first feedback duration is included in the DCI.

In a possible implementation, the determining a resource of the PUCCH based on the carrier on which the PUCCH is located and the DCI includes: obtaining a PUCCH resource set corresponding to the carrier on which the PUCCH is located, where there is the correspondence between the plurality of carriers and the plurality of PUCCH resource sets; and determining a PUCCH resource that is indicated by a first indication value and that is in the PUCCH resource set corresponding to the carrier on which the PUCCH is located as the resource of the PUCCH, where the first indication value is included in the DCI.

In a possible implementation, after the determining a resource of an uplink channel based on the DCI, the method further includes: sending the uplink information on the resource of the uplink channel.

In a possible implementation, the sending the uplink information on the resource of the uplink channel includes: when an SCS of the uplink channel is less than a first SCS, sending the uplink channel on the resource of the uplink channel at the first SCS.

This method may shorten a feedback latency.

In a possible implementation, the first SCS is an SCS of the PDCCH or an SCS of the PDSCH scheduled by using the DCI; the first SCS is an SCS of the PDCCH or an SCS of a CSI-RS, where the CSI-RS corresponds to CSI triggered by the PDCCH; or the first SCS is an SCS of the PDCCH.

According to a second aspect, this application provides a resource determining method, including:

determining a resource of an uplink channel, where the resource of the uplink channel is used to receive uplink information; and sending downlink control information DCI to a terminal device, where the DCI is carried on a physical downlink control channel PDCCH, and the DCI is used to indicate the resource of the uplink channel.

In a possible implementation, after the sending DCI to a terminal device, the method further includes: determining first processing duration, where the first processing duration includes at least one time unit; and when feedback duration is greater than or equal to the first processing duration, receiving the uplink information on the resource of the uplink channel, where the feedback duration is a time length between the resource of the uplink channel and a resource of a downlink channel corresponding to the uplink channel, and the downlink channel includes the PDCCH or a physical downlink shared channel PDSCH scheduled by using the DCI.

In a possible implementation, the determining first processing duration includes: obtaining at least one subcarrier spacing SCS and processing duration respectively corresponding to the at least one SCS, where the at least one SCS includes an SCS of the PDCCH and an SCS of the uplink channel; and determining shortest duration in the processing duration respectively corresponding to the at least one SCS as the first processing duration.

In a possible implementation, the at least one SCS further includes an SCS of the PDSCH scheduled by using the DCI, the uplink channel is a physical uplink control channel PUCCH, and the PUCCH carries feedback information corresponding to the PDSCH.

In a possible implementation, the at least one SCS further includes an SCS of a channel state information-reference signal CSI-RS, the uplink channel is a PUCCH or a PUSCH, the PUCCH or the PUSCH carries channel state information CSI corresponding to the CSI-RS, and the CSI is triggered by the DCI.

In a possible implementation, the uplink channel is a PUSCH scheduled by using the PDCCH.

In a possible implementation, the determining first processing duration includes: obtaining an SCS of the PDSCH scheduled by using the DCI and processing duration corresponding to the SCS of the PDSCH, where the PDSCH corresponds to the uplink channel, the uplink channel is a PUCCH, and the PUCCH carries feedback information corresponding to the PDSCH; and determining the processing duration corresponding to the SCS of the PDSCH as the first processing duration.

In a possible implementation, the determining first processing duration includes: obtaining an SCS of a CSI-RS and processing duration corresponding to the SCS of the CSI-RS, where the CSI-RS corresponds to the uplink channel, the uplink channel is a PUCCH or a PUSCH, the PUCCH or the PUSCH carries CSI corresponding to the CSI-RS, and the CSI is triggered by the DCI; and determining the processing duration corresponding to the SCS of the CSI-RS as the first processing duration.

In a possible implementation, before the determining first processing duration, the method further includes: determining whether a first condition is satisfied; and the determining first processing duration includes: when the first condition is satisfied, determining the first processing duration, where the first condition includes: a current service is a URLLC service; or a value of first indication information is a specified value.

In a possible implementation, the uplink channel is a PUCCH, and the PUCCH carries feedback information corresponding to a PDSCH scheduled by using the DCI; and the determining a resource of an uplink channel includes: determining a carrier on which the PUCCH is located; and determining a resource of the PUCCH based on the carrier on which the PUCCH is located.

In a possible implementation, when the DCI includes second indication information, a carrier corresponding to a value of the second indication information is the carrier on which the PUCCH is located; when the DCI includes feedback duration, if a time unit that is indicated by the feedback duration and that is of the feedback information corresponding to the PDSCH includes a downlink symbol, a default carrier is the carrier on which the PUCCH is located, where the feedback duration is a time length between the resource of the PUCCH and a resource of the PDSCH; or when the DCI includes the resource of the PUCCH, a carrier of the resource of the PUCCH is the carrier on which the PUCCH is located.

In a possible implementation, the determining a carrier on which the PUCCH is located includes: determining, based on a bit quantity of the feedback information, the carrier on which the PUCCH is located, where there is a correspondence between a plurality of bit quantities of the feedback information and a plurality of PUCCH resource sets, and there is a correspondence between the plurality of PUCCH resource sets and a plurality of carriers; or determining, based on a service type of the PDSCH, the carrier on which the PUCCH is located, where there is a correspondence between a plurality of service types of the PDSCH and a plurality of carriers.

In a possible implementation, the DCI includes the feedback duration, and a time unit indicated by the feedback duration in a feedback duration set corresponding to the carrier on which the PUCCH is located is a time unit in which the PUCCH is located, and there is a correspondence between the plurality of carriers and a plurality of feedback duration sets.

In a possible implementation, the DCI includes a first indication value, and a PUCCH resource that is indicated by the first indication value and that is in a PUCCH resource set corresponding to the carrier on which the PUCCH is located is the resource of the PUCCH, and there is the correspondence between the plurality of carriers and the plurality of PUCCH resource sets.

In a possible implementation, after the sending DCI to a terminal device, the method further includes: receiving the uplink information on the resource of the uplink channel.

In a possible implementation, the receiving the uplink information on the resource of the uplink channel includes: when an SCS of the uplink channel is less than a first SCS, receiving the uplink channel on the resource of the uplink channel at the first SCS.

In a possible implementation, the first SCS is an SCS of the PDCCH or an SCS of the PDSCH scheduled by using the DCI; the first SCS is an SCS of the PDCCH or an SCS of a CSI-RS, where the CSI-RS corresponds to CSI triggered by the PDCCH; or the first SCS is an SCS of the PDCCH.

According to a third aspect, this application provides a communication apparatus. For beneficial effects, refer to descriptions in the first aspect. Details are not described herein again. The communication apparatus has a function of implementing behavior in the method instances in the first aspect. The function may be implemented by using hardware, or may be implemented by hardware executing corresponding software. The hardware or the software includes one or more modules corresponding to the foregoing function. In a possible design, the communication apparatus includes: a receiving module, configured to receive downlink control information DCI sent by a network device, where the DCI is carried on a physical downlink control channel PDCCH; and a processing module, configured to determine a resource of an uplink channel based on the DCI, where the resource of the uplink channel is used to send uplink information. These modules may perform corresponding functions in the method examples in the first aspect. For details, refer to the detailed descriptions in the method examples. Details are not described herein again.

According to a fourth aspect, a communication apparatus is provided. For beneficial effects, refer to descriptions in the second aspect. Details are not described herein again. The communication apparatus has a function of implementing behavior in the method instances in the second aspect. The function may be implemented by using hardware, or may be implemented by hardware executing corresponding software. The hardware or the software includes one or more modules corresponding to the foregoing function. In a possible design, the communication apparatus includes: a processing module, configured to determine a resource of an uplink channel, where the resource of the uplink channel is used to receive uplink information; and a sending module, configured to send downlink control information DCI to a terminal device, where the DCI is carried on a physical downlink control channel PDCCH, and the DCI is used to indicate the resource of the uplink channel. These modules may perform corresponding functions in the method examples in the second aspect. For details, refer to the detailed descriptions in the method examples. Details are not described herein again.

According to a fifth aspect, a communication apparatus is provided. The communication apparatus may be the terminal device in the foregoing method embodiments or a chip disposed in the terminal device. The communication apparatus includes a communication interface and a processor. Optionally, the communication apparatus further includes a memory. The memory is configured to store a computer program or instructions. The processor is coupled to the memory and the communication interface. When the processor executes the computer program or the instructions, the communication apparatus is enabled to perform the methods performed by the terminal device in the foregoing method embodiments.

According to a sixth aspect, a communication apparatus is provided. The communication apparatus may be the network device in the foregoing method embodiment, or a chip disposed in the network device. The communication apparatus includes a communication interface and a processor. Optionally, the communication apparatus further includes a memory. The memory is configured to store a computer program or instructions. The processor is coupled to the memory and the communication interface. When the processor executes the computer program or the instructions, the communication apparatus is enabled to perform the methods performed by the network device in the foregoing method embodiments.

According to a seventh aspect, a computer program product is provided. The computer program product includes computer program code. When the computer program code is run, the methods performed by the terminal device in the foregoing aspects are enabled to be performed.

According to an eighth aspect, a computer program product is provided. The computer program product includes computer program code. When the computer program code is run, the methods performed by the network device in the foregoing aspects are enabled to be performed.

According to a ninth aspect, this application provides a chip system. The chip system includes a processor, configured to implement functions of the terminal devices in the methods in the foregoing aspects. In a possible design, the chip system further includes a memory, configured to store program instructions and/or data. The chip system may include a chip, or may include the chip and another discrete device.

According to a tenth aspect, this application provides a chip system. The chip system includes a processor, configured to implement functions of the network devices in the methods in the foregoing aspects. In a possible design, the chip system further includes a memory, configured to store program instructions and/or data. The chip system may include a chip, or may include the chip and another discrete device.

According to an eleventh aspect, this application provides a computer-readable storage medium. The computer-readable storage medium stores a computer program. When the computer program is run, the methods performed by the terminal device in the foregoing aspects are implemented.

According to a twelfth aspect, this application provides a computer-readable storage medium. The computer-readable storage medium stores a computer program. When the computer program is run, the methods performed by the network device in the foregoing aspects are implemented.

DESCRIPTION OF EMBODIMENTS

Figure 1:
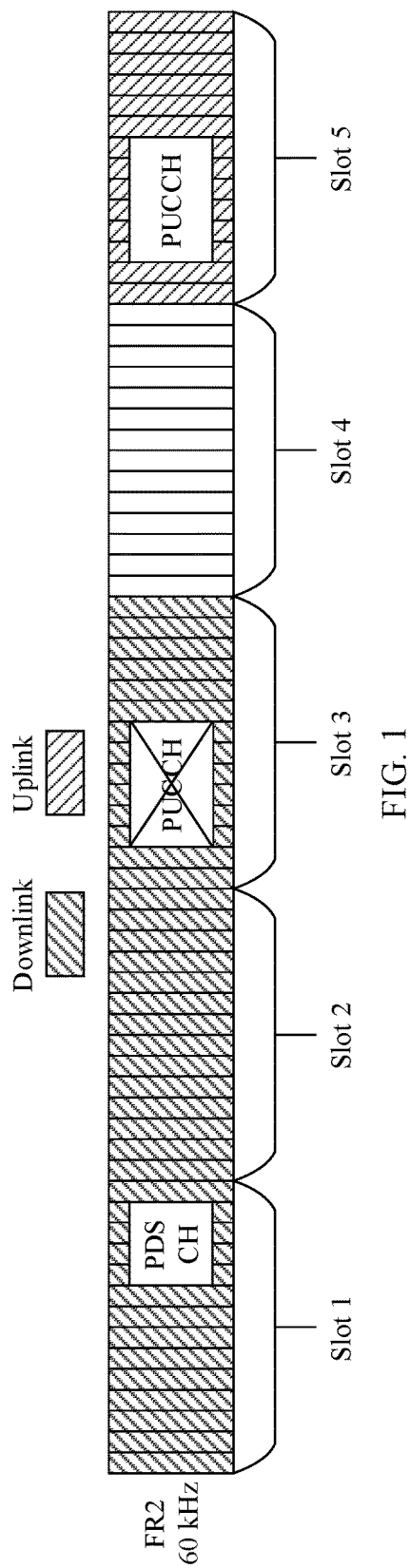
FIG. 1 is a schematic diagram of a resource of an uplink channel for sending uplink information.

To make the objectives, technical solutions, and advantages of this application clearer, the following clearly describes the technical solutions in this application with reference to the accompanying drawings in this application. Obviously, the described embodiments are a part rather than all of the embodiments of this application. All other embodiments obtained by a person of ordinary skill in the art based on the embodiments of this application without creative efforts shall fall within the protection scope of this application.

In the specification, embodiments, claims, and accompanying drawings of this application, the terms "first", "second", and the like are merely intended for distinguishing and description, and shall not be understood as an indication or implication of relative importance or an indication or implication of an order. Moreover, the terms "include", "have" and any variant thereof mean to cover non-exclusive inclusion, for example, include a series of steps or units. A method, a system, a product, or a device is not necessarily limited to those steps or units that are expressly listed, but may include other steps or units not expressly listed or inherent to such a procedure, a method, a product, or a device.

It should be understood that, in this application, "at least one" means one or more, and "a plurality of" means two or more. The term "and/or" is used to describe an association relationship between associated objects and represents that three relationships may exist. For example, "A and/or B" may represent the following three cases: Only A exists, only B exists, and both A and B exist, where A and B may be singular or plural. The character "/" generally indicates an "or" relationship between the associated objects. "At least one of the following" or a similar expression thereof means any combination of these items, including a single item or any combination of a plurality of items. For example, at least one of a, b, or c may represent a, b, c, "a and b", "a and c", "b and c", or "a, b, and c", where a, b, and c may be singular or plural.

Related Technical Description

Related Technology 1

For different bands, communication requirements may be different. Different communication requirements may be identified by using different frequency ranges FRs, and each FR may cover one or more bands. For example, a plurality of bands below a 6 GHz band (sub-6 GHz) may be referred to as FR1, and millimeter wave bands (mmwave bands) may be referred to as FR2. Differences between FR1 and FR2 may be as follows:

Frequency range: A frequency range of FR1 is 450 MHz to 6000 MHz. After Release-15 (Rel-15) of a communication protocol, a lowest frequency limit of FR1 may be extended to 410 MHz, and a highest frequency limit may be extended to 7125 MHz. A frequency range of FR2 is 24250 MHz to 52600 MHz.

Channel bandwidth: A maximum channel bandwidth of FR1 may be 100 MHz, and a maximum channel bandwidth of FR2 may be 400 MHz. A channel bandwidth of a network device is greater than or equal to a channel bandwidth of a terminal device, and the channel bandwidth of the terminal device may be located in any part of the channel bandwidth of the network device. When there are a plurality of channel bandwidths of the network device, the channel bandwidth of the terminal device may cross a boundary of the channel bandwidths of the network device.

Subcarrier spacing (SCS): SCSs of FR1 include 15 kHz, 30 kHz, and 60 kHz, and SCSs in sub-1 GHz include 15 kHz and 30 kHz. SCSs of FR2 include 60 kHz and 120 kHz.

Uplink and downlink transmission: In FR1, there may be a time division duplex (TDD) system or a frequency division duplex (FDD) system. In the TDD system, a time-frequency resource may be used only for downlink transmission or uplink transmission in a time unit. However, in the FDD system, the time-frequency resource may be used for both the uplink transmission and the downlink transmission in the time unit. For example, as shown in Table 1, D represents the downlink transmission, and U represents the uplink transmission. In the TDD system, assuming that there are five slots, where the first four slots are used for the downlink transmission, and the fifth slot is used for the uplink transmission. If a physical downlink shared channel (PDSCH) for sending downlink data is received in the first four slots, feedback information (for example, an acknowledgment (ACK) or a negative acknowledgment (NACK)) of the downlink data cannot be sent until the fifth slot. For example, the terminal device receives the PDSCH in the first slot, and the terminal device needs to wait for four slots to send the corresponding feedback information. Consequently, a long latency is caused. In the FDD system, assuming that there are five slots, each slot is used for the downlink transmission and the uplink transmission. The terminal device may receive the PDSCH while sending the corresponding feedback information, so that a latency can be reduced.

TABLE 1

|     | Slot 0 | Slot 1 | Slot 2 | Slot 3 | Slot 4 |
| --- | --- | --- | --- | --- | --- |
| TDD | D | D | D | D | U |
| FDD | D | D | D | D | D |
|     | U | U | U | U | U |

Related Technology 2

There may be the TDD system or the FDD system in FR1. However, the maximum channel bandwidth of FR1 may only be 100 MHz. A system bandwidth is limited. Consequently, a system capacity is limited. To support an ultra-reliable and low-latency communication (URLLC) service, so that a plurality of terminal devices can satisfy requirements of reliability and a low latency, carrier aggregation (CA) may be performed on FR1 and FR2, to increase the system capacity.

In a CA scenario, a procedure in which the terminal device sends the feedback information includes the following several steps.

(1) The terminal device receives, on a carrier, indication information sent by the network device on a physical downlink control channel (PDCCH). The indication information may indicate a carrier on which the PDSCH for sending the downlink data is located, and may further indicate K1. K1 is used to indicate a quantity of time units between a time unit in which the terminal device receives the PDSCH and a time unit in which the terminal device sends a physical uplink control channel (PUCCH) carrying the feedback information. In Rel-15, the time unit may be a slot. That is, the terminal device receives the PDSCH in a slot n, and sends the PUCCH in a slot n+K1. Specifically, PUCCH resource indication information is also carried on the PDCCH. The resource indication information indicates information such as a start symbol and a length of the PUCCH. A carrier on which the PUCCH is located is predefined, or is preconfigured by the network device for the terminal device.

(2) The terminal device receives, based on the PDCCH, the PDSCH on a resource indicated by the indication information, and determines, based on K1 and the start symbol of the PUCCH, whether a time length between the start symbol of the PUCCH and the PDCCH is greater than processing duration of the terminal device. The terminal device sends the feedback information on the determined PUCCH only when the time length is greater than or equal to the processing duration of the terminal device.

A protocol specifies the processing duration of the terminal device (namely, PDSCH processing procedure time (PDSCH processing procedure time)). As shown in Table 2, $\mu$ represents that an SCS is $2^\mu \times 15$ kHz. For example, if $\mu$ is 0, it indicates that the SCS is 15 kHz; if $\mu$ is 1, it indicates that the SCS is 30 kHz; if $\mu$ is 2, it indicates that the SCS is 60 kHz; and if $\mu$ is 3, it indicates that the SCS is 120 kHz.

TABLE 2

| $\mu$ | PDSCH processing procedure time $N_1$ [symbols] | |
| --- | --- | --- |
| 0 | 8 | $N_{1,0}$ |
| 1 | 10 | 13 |
| 2 | 17 | 20 |
| 3 | 20 | 24 |

On a 15 kHz carrier, the processing duration of the terminal device is 8 symbols. On a 30 kHz carrier, the processing duration of the terminal device is 10 symbols. On a 60 kHz carrier, the processing duration of the terminal device is 17 symbols. On a 120 kHz carrier, the processing duration of the terminal device is 20 symbols. The terminal device usually determines a processing capability based on an SCS of the PDCCH, an SCS of the PDSCH, or an SCS of the PUCCH. For example, a smallest SCS is selected from the SCSs to determine the processing duration of the terminal device.

EXAMPLE 1

CA is performed on FR1 and FR2. An SCS of FR1 is 30 kHz, and there is an FDD system. An SCS of FR2 is 60 kHz, and there is a TDD system. It is configured by a higher layer that the feedback information is sent in FR2, that is, the carrier on which the PUCCH is located is FR2. That is, the terminal device sends the PUCCH in FR2. In this case, the SCS of the PUCCH is 60 kHz. If both the PDCCH and the PDSCH are sent in FR2, the SCS of the PDCCH and the SCS of the PDSCH are both 60 kHz. According to Table 2, the processing duration of the terminal device is processing duration, namely, 17 symbols, corresponding to 60 kHz. As shown in FIG. 1, assuming that symbol numbers in a slot are 0 to 13, and the PDSCH is sent on symbols 9 to 12 in a slot 1, a symbol that can first send the feedback information is a symbol 2 in a slot 3 based on the processing duration of the terminal device. In this case, K1 may be set to 2, and then it is indicated that the PUCCH resource corresponds to symbols 2 to 7. However, because there is the TDD system in FR2, and only the fifth slot is used for the uplink transmission, K1 can be set only to 4, and the terminal device needs to send the PUCCH on symbols 2 to 7 in the slot 5.

It can be learned that in the foregoing Example 1, because of the TDD system, the symbol on which the terminal device sends the feedback information is two slots later than expected, which is approximately equal to a feedback latency of 0.5 ms. Because the feedback information cannot reach the network device in time, the network device cannot schedule retransmission as soon as possible. Consequently, a service latency is caused, and service reliability is affected.

EXAMPLE 2

Figure 2:
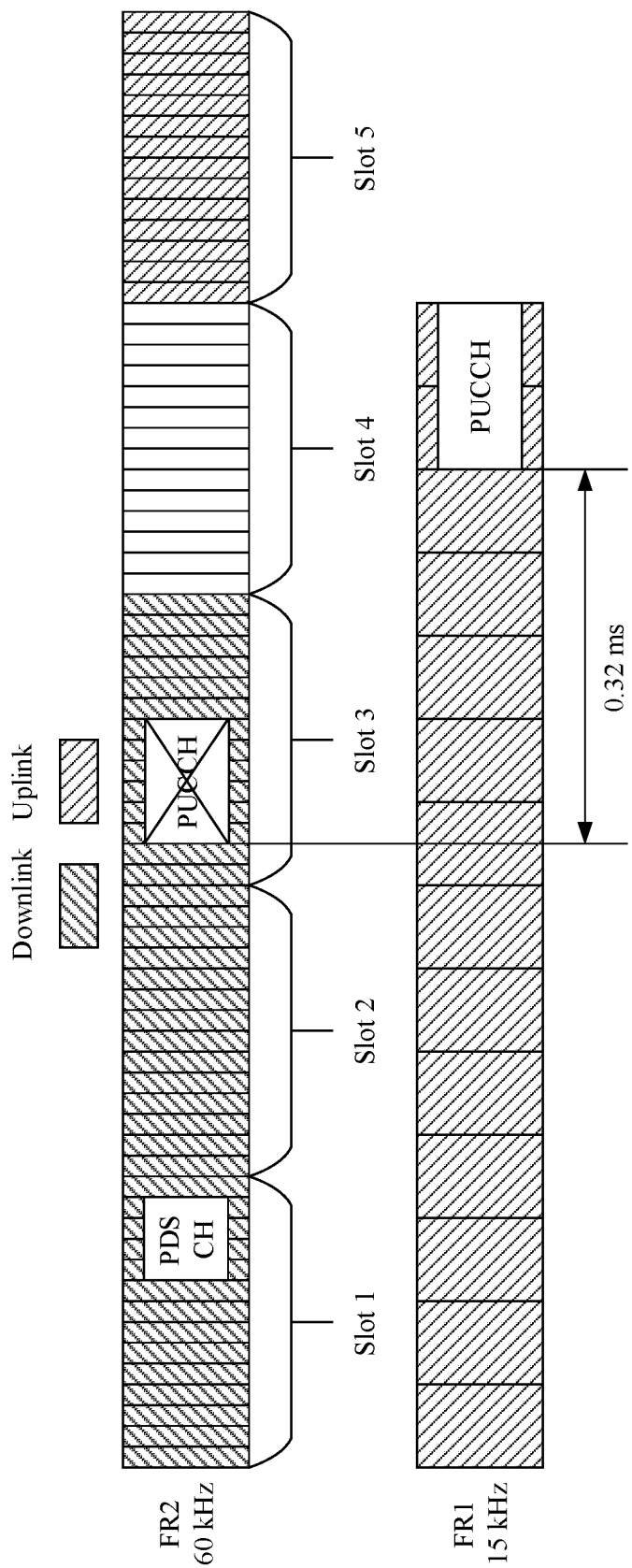
FIG. 2 is another schematic diagram of a resource of an uplink channel for sending uplink information.

CA is performed on FR1 and FR2. An SCS of FR1 is 15 kHz, and there is an FDD system. An SCS of FR2 is 60 kHz, and there is a TDD system. It is configured by a higher layer that the feedback information is sent in FR1, that is, the carrier on which the PUCCH is located is FR1. That is, the terminal device sends the PUCCH in FR1. In this case, the SCS of the PUCCH is 15 kHz. If both the PDCCH and the PDSCH are sent in FR2, the SCS of the PDCCH and the SCS of the PDSCH are both 60 kHz. According to Table 2, the processing duration of the terminal device is processing duration corresponding to 15 kHz (the smallest SCS among the SCS of the PUCCH, the SCS of the PDCCH, and the SCS of the PDSCH), namely, 8 symbols corresponding to 15 kHz. As shown in FIG. 2, assuming that symbol numbers in a slot are 0 to 13, and the PDSCH is sent on symbols 9 to 12 in a slot 1 of FR2, a symbol that can first send the feedback information is a symbol 11 in a slot 1 of FR1 based on the processing duration of the terminal device. In this case, K1 may be set to 0, and then it is indicated that the PUCCH resource corresponds to symbols 12 and 13. However, actually, time of sending on the indicated symbols is delayed compared with time of sending on the symbols 2 to 7 in FR2 in Example 1.

It can be learned that in the foregoing Example 2, the symbol on which the terminal device sends the feedback information is later than that in FR2, which is approximately equal to a feedback latency of 0.32 ms. Because the feedback information cannot reach the network device in time, the network device cannot schedule retransmission as soon as possible. Consequently, a service latency is caused, and service reliability is affected.

In a CA scenario, a procedure in which the terminal device sends channel state information (CSI) includes the following several steps.

(1) The terminal device receives, on a carrier, indication information sent by the network device on a PDCCH. The indication information may trigger reporting of CSI, indicate a carrier for sending the CSI, and may further indicate K2. K2 is used to indicate a quantity of time units between a time unit in which the terminal device receives the PDCCH and a time unit in which the terminal device sends a PUCCH or a physical uplink shared channel (PUSCH) carrying the CSI. In Rel-15, the time unit may be a slot. That is, the terminal device receives the PDCCH in a slot n, and sends the CSI in a slot n+K2.

(2) The terminal device determines a time length between a time domain position of the PUSCH and the PUCCH and a time domain position of the PDCCH based on K2, and determines whether a value of the time length is greater than processing duration of the terminal device. The terminal device sends, only when the value of the time length is greater than or equal to the processing duration of the terminal device, the CSI on a PUCCH or a PUSCH corresponding to a time unit indicated by K2.

A protocol specifies the processing duration of the terminal device (namely, CSI computation time). As shown in Table 3, $\mu$ represents that an SCS is $2^{\mu} \times 15$ kHz. For example, if $\mu$ is 0, it indicates that the SCS is 15 kHz; if $\mu$ is 1, it indicates that the SCS is 30 kHz; if $\mu$ is 2, it indicates that the SCS is 60 kHz; and if $\mu$ is 3, it indicates that the SCS is 120 kHz.

TABLE 3

| | CSI computation time $Z_1$ [symbols] | |
|---|---|---|
| $\mu$ | $Z_1$ | $Z'_1$ |
| 0 | 10 | 8 |
| 1 | 13 | 11 |
| 2 | 25 | 21 |
| 3 | 43 | 36 |

On a 15 kHz carrier, the processing duration of the terminal device is 10 symbols. On a 30 kHz carrier, the processing duration of the terminal device is 13 symbols. On a 60 kHz carrier, the processing duration of the terminal device is 25 symbols. On a 120 kHz carrier, the processing duration of the terminal device is 43 symbols. The terminal device usually determines a processing capability based on an SCS of the PDCCH, an SCS of a channel state information-reference signal (CSI-RS), or an SCS of the CSI (namely, the PUSCH or the PUCCH). For example, a smallest SCS is selected from the SCSs to determine the processing duration of the terminal device.

EXAMPLE 3

CA is performed on FR1 and FR2. An SCS of FR1 is 15 kHz, and there is an FDD system. An SCS of FR2 is 60 kHz, and there is a TDD system. Assuming that the PDCCH and the CSI-RS are sent in FR2, and a channel state in FR2 needs to be measured, that is, the terminal device performs channel estimation based on the CSI-RS in FR2. In this case, the SCSs of the PDCCH and the CSI-RS are both 60 kHz. If the PDCCH indicates to send the CSI in FR2, according to Table 3, the processing duration of the terminal device is processing duration, namely, 25 symbols, corresponding to 60 kHz. Because there is the TDD system in FR2, a downlink symbol may be included after the 25 symbols. Consequently, sending of the CSI needs to be delayed. If the PDCCH indicates to send the CSI in FR1, according to Table 3, the processing duration of the terminal device is processing duration, namely, 10 symbols corresponding to 15 kHz. The processing duration is equivalent to 40 symbols corresponding to 60 kHz. There are still 15 more symbols than the 25 symbols for sending the CSI in FR2, and a latency of approximately 0.3 ms is caused.

It can be learned that in the foregoing Example 3, if the CSI is sent in FR2, because of the TDD system, the symbol on which the terminal device sends the CSI is later than expected. If the CSI is sent in FR1, because the processing duration is determined based on 15 kHz, a latency is also caused. The CSI cannot be fed back in time, and a base station cannot obtain the channel state information in time, and therefore cannot adjust a scheduling policy. Consequently, it is quite difficult to ensure service reliability and a low latency.

In a CA scenario, a procedure in which the terminal device sends a PUSCH includes the following several steps.

(1) The terminal device receives, on a carrier, indication information sent by the network device on a PDCCH. The indication information may indicate a carrier on which a PUSCH for sending uplink data is located, and may further indicate K3. K3 is used to indicate a quantity of time units between a time unit in which the terminal device receives the PDCCH and a time unit in which the terminal device sends the PUSCH carrying the uplink data. In Rel-15, the time unit may be a slot. That is, the terminal device receives the PDCCH in a slot n, and sends the uplink data in a slot n+K3.

(2) The terminal device determines, based on K3, whether a time length between a start symbol of the PUSCH and the PDCCH is greater than processing duration of the terminal device. The terminal device sends, only when a value of K3 is greater than or equal to the processing duration of the terminal device, the uplink data on a PUSCH corresponding to a time unit indicated by K3.

A protocol specifies the processing duration of the terminal device (namely, PUSCH preparation time). As shown in Table 4, μ represents that an SCS is $2^μ \times 15$ kHz. For example, if μ is 0, it indicates that the SCS is 15 kHz; if μ is 1, it indicates that the SCS is 30 kHz; if μ is 2, it indicates that the SCS is 60 kHz; and if μ is 3, it indicates that the SCS is 120 kHz.

TABLE 4

| μ | PUSCH preparation time N2 [symbols] |
|---|---|
| 0 | 10 |
| 1 | 12 |
| 2 | 23 |
| 3 | 36 |

On a 15 kHz carrier, the processing duration of the terminal device is 10 symbols. On a 30 kHz carrier, the processing duration of the terminal device is 12 symbols. On a 60 kHz carrier, the processing duration of the terminal device is 23 symbols. On a 120 kHz carrier, the processing duration of the terminal device is 36 symbols. The terminal device usually determines a processing capability based on an SCS of a PDCCH or an SCS of a PUSCH. For example, a smallest SCS is selected from the SCSs to determine the processing duration of the terminal device.

EXAMPLE 4

CA is performed on FR1 and FR2. An SCS of FR1 is 15 kHz, and there is an FDD system. An SCS of FR2 is 60 kHz, and there is a TDD system. It is assumed that the PDCCH is transmitted in FR2. If the PDCCH indicates to send the uplink data in FR2, that is, the terminal device sends the PUSCH in FR2, according to Table 4, the processing duration of the terminal device is processing duration, namely, 23 symbols, corresponding to 60 kHz. Because there is the TDD system in FR2, a downlink symbol may be included after the 23 symbols. Consequently, sending of the uplink data needs to be delayed. If the PDCCH indicates to send the uplink data in FR1, according to Table 4, the processing duration of the terminal device is processing duration, namely, 10 symbols, corresponding to 15 kHz. The processing duration is equivalent to 40 symbols corresponding to 60 kHz. There are still 17 more symbols than the 23 symbols for sending the CSI in FR2, and a latency of approximately 0.3 ms is caused.

It can be learned that in the foregoing Example 4, if the uplink data is sent in FR2, because of the TDD system, the symbol on which the terminal device sends the uplink data is later than expected. If the uplink data is sent in FR1, because the processing duration is determined based on 15 kHz, a latency is also caused. The uplink data cannot be fed back in time, and a base station cannot obtain data of the terminal device in time. Consequently, it is quite difficult to ensure service reliability and a low latency.

Figure 3:
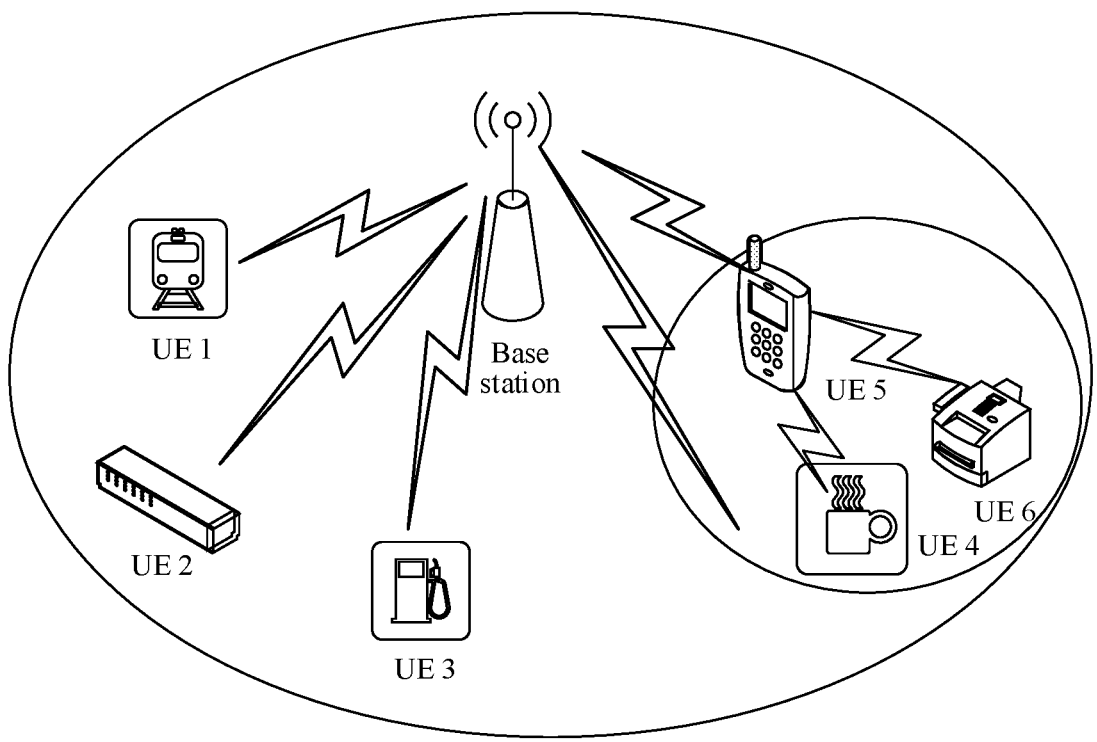
FIG. 3 is an example of a schematic diagram of a communication system.

Based on the foregoing related technologies, this application provides a resource determining method. FIG. 3 is an example of a schematic diagram of a communication system. As shown in FIG. 3, the communication system, for example, a long term evolution (LTE) system, may include a base station and a user equipment (UE) 1 to 6. The UE 1 to the UE 6 send first information to the base station. In addition, a communication system may alternatively include the UE 4 to the UE 6. In the communication system, the base station may send downlink information to the UE 1, the UE 2, the UE 3, and the UE 5. The UE 5 may also send the downlink information to the UE 4 and the UE 6.

It should be noted that, in addition to being applied to the foregoing LTE system, a scheduling method provided in this application may be further applied to another communication system, for example, a 5G new radio (NR) system, a global system for mobile communications (GSM), a universal mobile telecommunications system (UMTS), or code division multiple access (CDMA) system, a wideband code division multiple access (WCDMA) system, a narrowband internet of things (NB-IoT) system, an enhanced machine type communication (eMTC) system, and another communication system. The scheduling method provided in this application may be used provided that a network device in the communication system needs to send downlink control information, and a terminal device needs to receive the downlink control information and determine a data channel based on the downlink control information.

The network device may be configured to mutually convert a received over-the-air frame and an internet protocol (IP) packet, and serve as a router between a wireless terminal and a remaining part of an access network, where the remaining part of the access network may include an IP network. The network device may further coordinate attribute management of an air interface. For example, the network device may be a base transceiver station (BTS) in GSM or CDMA, may be a NodeB in WCDMA, or may be an evolved NodeB (evolutional NodeB, or eNB, or eNodeB) in LTE, or a gNB in 5G NR. This is not specifically limited in this application.

The terminal device may be a device that provides a user with a voice and/or data connectivity, a handheld device with a wireless connection function, or another processing device connected to a wireless modem. The terminal device may communicate with one or more core networks by using a radio access network (RAN). The terminal device may be a mobile terminal, for example, a mobile phone (or referred to as a "cellular" phone) and a computer having a mobile terminal, or may be a portable, pocket-sized, handheld, computer built-in, or in-vehicle mobile apparatus. The terminal device exchanges language and/or data with the radio access network. For example, the terminal device is a device such as a personal communications service (PCS) phone, a cordless phone, a session initiation protocol (SIP) phone, a wireless local loop (WLL) station, or a personal digital assistant (PDA). The terminal device may also be referred to as a system, a subscriber unit, a subscriber station, a mobile station, a remote station, an access point, a remote terminal, an access terminal, a user terminal, a user agent, a user device, or a user equipment (UE).

Figure 4:
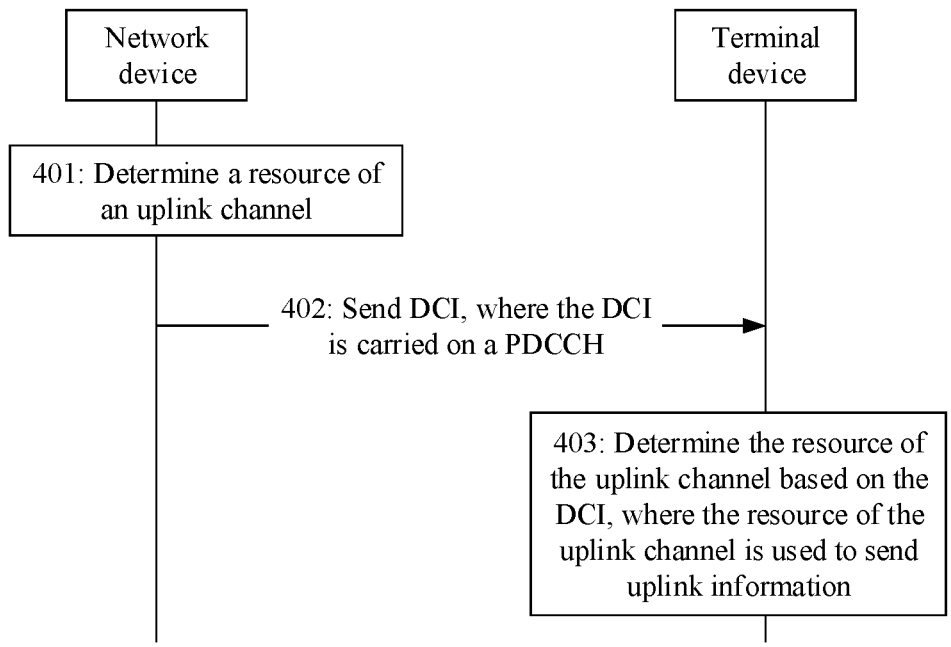
FIG. 4 is a flowchart of an embodiment of a resource determining method according to this application.

FIG. 4 is a flowchart of an embodiment of a resource determining method according to this application. As shown in FIG. 4, the method in this embodiment may be applied to the communication system shown in FIG. 3. The resource determining method may include the following steps.

Step 401: A network device determines a resource of an uplink channel.

When a terminal device needs to send uplink information (for example, uplink data), or the network device requires the terminal device to send uplink information (for example, CSI or feedback information that corresponds to downlink information), the network device allocates a resource used by the terminal device to send the uplink information. Therefore, the network device may determine, based on factors such as a capability of each terminal device, a service requirement, and resource distribution, to allocate, to the terminal device, the resource that is of the uplink channel and that is used by the terminal device to send the uplink information.

Step 402: The network device sends DCI to the terminal device, where the DCI is carried on a PDCCH.

The network device writes indication information indicating the resource of the uplink channel to the DCI, and sends the DCI to the terminal device via the PDCCH.

Step 403: The terminal device determines the resource of the uplink channel based on the DCI, where the resource of the uplink channel is used to send the uplink information.

The terminal device receives the PDCCH, obtains the DCI through parsing, and obtains the indication information of the network device from the DCI, to determine the resource that is of the uplink channel and that is allocated by the network device. Then, the terminal device may send the uplink information in a corresponding time unit, on a corresponding carrier, and in a corresponding band by using the resource of the uplink channel.

The foregoing procedure is a basic procedure in which the network device dynamically schedules the terminal device. The procedure may be applied to the following three application scenarios:

Scenario 1: A procedure in which the terminal device sends the feedback information includes the following steps.

Specifically, in the scenario 1, the uplink information is feedback information, for example, an acknowledgment (ACK) or a negative acknowledgment (NACK), corresponding to a PDSCH. The uplink channel is a PUCCH, and the PDSCH is scheduled by using the DCI carried in the PDCCH.

(1) The network device sends the PDCCH on a carrier. The DCI carried on the PDCCH includes indication information indicating a carrier on which a PDSCH for sending downlink data is located and K1, and K1 is a quantity of time units between a resource of the PDSCH and a resource of a PUCCH carrying the feedback information corresponding to the PDSCH. In this embodiment of this application, a length of the time unit may be a slot, or the length of the time unit may be one or more symbols. For example, the terminal device receives the PDSCH in a slot n, and sends the PUCCH in a slot n+K1. The terminal device may further indicate a start symbol of the PUCCH in the time unit.

(2) The terminal device receives, based on the PDCCH, the PDSCH on a resource indicated by the DCI, and determines the resource of the PUCCH based on K1, to determine a time length between the resource of the PUCCH and the PDCCH, and determine whether the time length is greater than processing duration of the terminal device (namely, PDSCH processing procedure time). The terminal device sends the feedback information on the resource of the PUCCH only when the time length is greater than or equal to the processing duration of the terminal device.

Scenario 2: A procedure in which the terminal device sends the CSI includes the following steps.

Specifically, in the scenario 2, the uplink information is the CSI, and the uplink channel is a PUCCH or a PUSCH.

(1) The network device sends the PDCCH on a carrier. The DCI carried on the PDCCH includes indication information triggering reporting of the CSI and indicating a carrier on which the CSI is located and K2, and K2 is a quantity of time units between a resource of the PDCCH and a resource of a PUCCH or a PUSCH carrying the CSI. For example, the terminal device receives the PDCCH in a slot n, and sends the CSI in a slot n+K2.

(2) The terminal device determines the resource of the PUCCH or the PUSCH based on K2, determines a time length between the resource of the PUCCH or the PUSCH and the PDCCH, and determines whether the time length is greater than processing duration of the terminal device (namely, CSI computation time). The terminal device sends the CSI on the PUCCH or the PUSCH only when the time length is greater than or equal to the processing duration of the terminal device.

Scenario 3: A procedure in which the terminal device sends a PUSCH includes the following steps.

Specifically, in the scenario 3, the uplink information is the uplink data, and the uplink channel is a PUSCH scheduled by using the DCI carried on the PDCCH.

(1) The network device sends the PDCCH on a carrier. The DCI carried on the PDCCH includes indication information indicating a carrier on which a PUSCH for sending the uplink data is located and K3, and K3 is a quantity of time units between a resource of the PDCCH and a resource of the PUSCH carrying the uplink data. For example, the terminal device receives the PDCCH in a slot n, and sends the uplink data in a slot n+K3.

(2) The terminal device determines the resource of the PUSCH based on K3, to determine a time length between the resource of the PUSCH and the PDCCH, and determine whether the time length is greater than processing duration of the terminal device (namely, PUSCH preparation time). The terminal device sends, only when a value of the time length is greater than or equal to the processing duration of the terminal device, the uplink data on a PUSCH corresponding to a time unit indicated by K3.

The following describes the technical solutions of the resource determining method provided in this application in detail by using several embodiments with reference to the foregoing three scenarios.

Embodiment 1

Terminal device side: After determining the resource of the uplink channel based on the DCI, the terminal device may determine the processing duration. The processing duration includes at least one time unit. When feedback duration is greater than or equal to the processing duration, the terminal device sends the uplink information on the resource of the uplink channel.

The terminal device may determine the processing duration by using the following three methods.

Method 1: Obtain at least one SCS and processing duration respectively corresponding to at least one SCS, and determine shortest duration in the processing duration respectively corresponding to the at least one SCS as the processing duration.

Corresponding to the scenario 1, the at least one SCS includes an SCS of the PDCCH carrying the DCI, an SCS of the PDSCH scheduled by using the DCI, and an SCS of the PUCCH carrying the feedback information corresponding to the PDSCH. The feedback duration is a time length between the resource of the PDSCH and the resource of the PUCCH (the feedback information).

Corresponding to the scenario 2, the at least one SCS includes an SCS of the PDCCH carrying the DCI, an SCS of a CSI-RS, and an SCS of a PUCCH or a PUSCH carrying CSI corresponding to the CSI-RS. The feedback duration is a time length between the resource of the PDCCH and a resource of the PUCCH or the PUSCH (the CSI).

Corresponding to the scenario 3, the at least one SCS includes an SCS of the PDCCH carrying the DCI and an SCS of the PUSCH scheduled by using the DCI. The feedback duration is a time length between the resource of the PDCCH and the resource of the PUSCH.

As described in the foregoing examples, a protocol specifies the processing duration of the terminal device. There is a correspondence between an SCS and the processing duration. A smaller SCS indicates a smaller quantity of symbols included in the processing duration of the terminal device but longer total duration of the symbols. In other words, duration occupied by a symbol with a large SCS is less than duration occupied by a symbol with a small SCS. In this application, processing duration (where the processing duration is the shortest duration in the processing duration respectively corresponding to the at least one SCS) corresponding to a largest SCS in the at least one SCS is selected as the processing duration of the terminal device. The feedback duration may be set to a value that is slightly greater than or equal to the processing duration. Because the processing duration is the shortest, short feedback duration may be used to satisfy a condition of being greater than or equal to the processing duration. This reduces a latency of sending the uplink information by the terminal device.

Method 2: Obtain an SCS of a downlink channel and processing duration corresponding to an SCS of the downlink channel, and determine the processing duration corresponding to the SCS of the downlink channel as the processing duration.

Corresponding to the scenario 1, the SCS of the downlink channel is an SCS of the PDSCH scheduled by using the DCI. The feedback duration is a time length between the resource of the PDSCH and the resource of the PUCCH (the feedback information).

Corresponding to the scenario 2, the SCS of the downlink channel is an SCS of a CSI-RS. The feedback duration is a time length between the resource of the PDCCH and the resource of the PUCCH or the PUSCH (the CSI).

As described in the foregoing examples, the processing duration corresponding to the SCS of the downlink channel is determined as the processing duration. When the SCS corresponding to the downlink channel is larger, the processing duration corresponding to the SCS is shorter. The processing duration corresponding to the SCS is used, so that shorter feedback duration can be used to satisfy a condition of being greater than or equal to the processing duration. This reduces a latency of sending the uplink information by the terminal device. When the SCS corresponding to the downlink channel is smaller, although the processing duration corresponding to the SCS is longer, because the SCS is used for the downlink channel, it indicates that processing time of the downlink channel should be longer. In other words, data carried on the downlink channel is not so urgent. In this case, using the SCS to determine a processing capability does not affect the latency.

Method 3: Determine whether a condition is satisfied. The condition may include: A current service is a specified service; or a value of first indication information is a specified value. When the condition is satisfied, the foregoing method 1 or method 2 may be used to determine the processing duration. When the foregoing condition is not satisfied, the processing duration is determined by using the method in the foregoing related technology.

The specified service may be a service of a specific type, and the service of the specific type requires reliability and a low latency, or the service of the specific type requires a high throughput. For example, if the terminal device determines that the specified service is a URLLC service, it is considered that the condition is satisfied, and the processing duration is determined by using the foregoing method 1 or method 2; if the terminal device determines that a non-URLLC service is currently performed, it is considered that the condition is not satisfied, and the processing duration may be determined by using the method in the foregoing related technology. A service type may be identified by using any one of the following methods: The terminal device determines the service type based on a DCI format. There is a correspondence between the DCI format and the service type. For example, if the DCI format is DCI format 1_2, it is considered that the service is the URLLC service; if the DCI format is DCI format 1_1 or DCI format 1_0, it may be considered that the service is an enhanced mobile broadband (eMBB) service, namely, an unspecified service. Alternatively, the terminal device determines the service type based on a mapping type of a PDSCH. There is a correspondence between the mapping type of the PDSCH and the service type. For example, if the mapping type of the PDSCH is A, it is considered that the service is a specified service; if the mapping type of the PDSCH is B, it is considered that the service is an unspecified service. The mapping type of the PDSCH refers to a location of a demodulation reference signal (DMRS) used for demodulation of the PDSCH. The mapping type A indicates that the location of the DMRS is the third or the fourth symbol in one slot, and the mapping type B indicates that the location of the DMRS is the first symbol of data. Alternatively, the terminal device determines the service type based on search space in which a PDCCH is located. There is a correspondence between the search space in which the PDCCH is located and the service type. For example, if an identifier of the search space is 1, it is considered that the service is a specified service; if an identifier of the search space is 2, it is considered that the service is an unspecified service. Alternatively, for example, if an identifier of the search space is less than or equal to X, it is considered that the service is a specified service; if an identifier of the search space is greater than X, it is considered that the service is an unspecified service. Alternatively, the terminal device determines the service type based on a control resource set (CORESET). There is a correspondence between the CORESET and the service type. For example, if an identifier of the CORESET is 1, it is considered that the service is a specified service; if an identifier of the search space is 2, it is considered that the service is an unspecified service. Alternatively, for example, if an identifier of the CORESET is less than or equal to X, it is considered that the service is a specified service; if an identifier of the CORESET is greater than X, it is considered that the service is an unspecified service. Alternatively, the terminal device determines the service type based on a bit field displayed in a PDCCH. There is a correspondence between the bit field displayed in the PDCCH and the service type. For example, there is one bit in DCI. If the bit indicates 0, the service is a specified service; if the bit indicates 1, the service is an unspecified service. Alternatively, the terminal device determines the service type based on a scrambling manner of DCI. There is a correspondence between the scrambling manner of the DCI and the service type. For example, if the DCI is scrambled by using a radio network temporary identifier (RNTI) 1, it is considered that service is a specified service; if the DCI is scrambled by using an RNTI 2, it is considered that service is a specified service. Alternatively, the terminal device determines the service type based on a time domain resource length of a PDSCH. There is a correspondence between the time domain resource length of the PDSCH and the service type. For example, if the time domain length of the PDSCH is less than or equal to L, it is considered that the service is a specified service; if the time domain length of the PDSCH is greater than or equal to L, it is considered that the service is an unspecified service.

The first indication information may be carried in higher layer signaling, for example, radio resource control (RRC) signaling, or may be indicated by the network device by using the DCI. When the value of the first indication information is the specified value (for example, the value is 1), it is considered that the condition is satisfied. In this case, the terminal device may determine the processing duration by using the foregoing method 1 or method 2. When the value of the first indication information is not the specified value (for example, the value is 0), it is considered that the condition is not satisfied. In this case, the terminal device may determine the processing duration by using the method in the foregoing related technology. However, if the first indication information is configure neither at the higher layer nor in the DCI, the terminal device may determine the processing duration by using a default method (for example, the method in the foregoing related technology).

After determining the processing duration, the terminal device determines the feedback duration based on the information (for example, K1, K2, or K3) indicated in the DCI. As described in the scenario 1 to the scenario 3, the feedback duration is compared with the processing duration. If the feedback duration is greater than or equal to the processing duration, the terminal device sends the uplink information on the uplink channel according to an indication of the DCI. If the feedback duration is less than the processing duration, it indicates that on the uplink channel, the terminal device does not have sufficient time for PDSCH processing, CSI computation, or PUSCH preparation, and therefore cannot send the uplink information on the uplink channel. In this case, the terminal device does not send the uplink information to the network device.

Network device side: After sending the DCI to the terminal device, the network device may determine the processing duration of the terminal device. The processing duration includes the at least one time unit. When the feedback duration indicated in the DCI is greater than or equal to the processing duration of the terminal device, the network device receives uplink information on the resource of the uplink channel.

The network device may also determine the processing duration of the terminal device by using three methods. Technical principles of the three methods are similar to those of the foregoing three methods on the terminal device side. Details are not described herein again.

After determining the processing duration of the terminal device, the network device determines the feedback duration based on the information (for example, K1, K2, or K3) indicated in the DCI. As described in the scenario 1 to the scenario 3, the feedback duration is compared with the processing duration of the terminal device. If the feedback duration is greater than or equal to the processing duration, the network device receives the uplink information on the uplink channel indicated by the feedback duration. However, if the feedback duration is less than the processing duration, it indicates that on the uplink channel indicated by the feedback duration, the terminal device does not have sufficient time for PDSCH processing, CSI computation, or PUSCH preparation, and therefore cannot send the uplink information on the uplink channel. In this case, the network device does not need to receive the uplink information.

In this embodiment, both the network device and the terminal device use the shortest duration as the processing duration of the terminal device. Therefore, the feedback duration may be set to the value slightly greater than or equal to the processing duration. Because the processing duration is the shortest, and the short feedback duration may be used to satisfy the condition of being greater than or equal to the processing duration, the terminal device sends, as soon as possible, the uplink information on the uplink channel corresponding to the time unit indicated by the feedback duration, to reduce a latency of sending the uplink information.

Embodiment 2

A method in this embodiment is applied to the case in the scenario 1.

Terminal device side: In a procedure in which the terminal device determines the resource of the uplink channel, the terminal device may first determine a carrier on which the PUCCH is located, and then determine the resource of the PUCCH based on the carrier on which the PUCCH is located and the DCI. The PUCCH carries the feedback information corresponding to the PDSCH, and the PDSCH is scheduled by using the DCI carried on the PDCCH.

The terminal device may determine, by using any one of the following methods, the carrier on which the PUCCH is located:

1. When the DCI includes second indication information, the terminal device determines a carrier corresponding to a value of the second indication information as the carrier on which the PUCCH is located.

The second indication information may be N-bit information carried in the DCI. There is a correspondence between the N-bit information and a maximum of 2N carriers. For example, N is 2 bits. A value of the 2 bits is 00, corresponding to a carrier 0; a value of the 2 bits is 01, corresponding to a carrier 1; a value of the 2 bits is 10, corresponding to a carrier 3; and a value of the 2 bits is 11, corresponding to a carrier 4. The network device may directly indicate, in the DCI based on an allocation status of a frequency domain resource, a carrier on which the PUCCH is located and that is available to the terminal device.

2. When the DCI includes feedback duration, for example, the DCI in the scenario 1 includes K1 indication information and PUCCH resource indication information, the feedback duration may be determined. If the resource of the uplink channel indicated by the feedback duration includes a downlink symbol, the terminal device determines a default carrier as the carrier on which the PUCCH is located.

Because the indicated resource of the PUCCH needs to be used by the terminal device to send the feedback information corresponding to the PDSCH, if the resource of the PUCCH includes the downlink symbol, the terminal device cannot send the feedback information in time. Therefore, the carrier on which the PUCCH is located may switch to a carrier that may be used to send the uplink information (in other words, on the carrier, the time unit does not include the downlink symbol), so that the terminal device can send the feedback information by using the carrier in time. The default carrier may be a carrier adjacent to an original carrier, the default carrier may be a carrier whose band is closest to a band of the original carrier and that satisfies the foregoing condition, or the default carrier may be a carrier indicated by configuration information sent by the network device to the terminal device. This is not specifically limited in this application.

3. When the DCI includes PUCCH resource indication information, the terminal device determines a carrier of the resource of the PUCCH as the carrier on which the PUCCH is located.

There is a correspondence between the resource of the PUCCH and the carrier. The DCI has a resource indication function. For example, the network device sends the configuration information to the terminal device to indicate one or more PUCCH resources, where configuration information of each PUCCH resource includes a specific resource of the PUCCH. For example, a start symbol or a length of the PUCCH, and further indicates the carrier corresponding to the PUCCH. Therefore, after the terminal device determines one PUCCH resource in the one or more PUCCH resources indicated by the DCI, a carrier corresponding to the PUCCH resource is indicated.

4. The terminal device determines, based on a bit quantity of the feedback information, the carrier on which the PUCCH is located, where there is a correspondence between a plurality of bit quantities of the feedback information and a plurality of PUCCH resource sets, and there is a correspondence between the plurality of the PUCCH resource sets and a plurality of carriers.

The network device may configure one or more PUCCH resource sets for the terminal device by using higher layer signaling, and configure a carrier corresponding to each PUCCH resource set. For example, a first PUCCH resource set corresponds to a carrier 1, a second PUCCH resource set corresponds to a carrier 2, and the like. Alternatively, after one or more PUCCH resource sets are configured, a carrier corresponding to each PUCCH resource set may be specified by using a protocol. For example, it is specified that a first PUCCH resource set corresponds to a carrier 1, a second PUCCH resource set corresponds to a carrier 2, and the like.

The network device may alternatively indicate, by using configuration information, or specify, by using a protocol, a correspondence between a plurality of bit quantities of the feedback information and a plurality of PUCCH resource sets. For example, a bit quantity range X1 and X2 corresponds to a first PUCCH resource set, a bit quantity range X3 and X4 corresponds to a second PUCCH resource set, and the like. The terminal device determines a bit quantity of the feedback information, to determine a PUCCH resource set corresponding to the bit quantity. Because a carrier corresponding to the PUCCH resource set is determined, the corresponding carrier may be obtained based on the PUCCH resource set. That is, all PUCCH resources in a same PUCCH resource set are on a same carrier. When a PUCCH resource set in which a PUCCH resource is located is known, a carrier on which the PUCCH resource is located is determined.

5. The terminal device determines, based on a service type of the PDSCH, the carrier on which the PUCCH is located. There is a correspondence between a plurality of service types of the PDSCH and a plurality of carriers. For example, a service type 1 corresponds to a carrier 1, and a service type 2 corresponds to a carrier 2.

A higher layer may configure the correspondence between the service types and the carriers, or the correspondence between the service types and the carriers is specified in a protocol. After determining a current service type, the terminal device may obtain a corresponding carrier. For a manner of determining the service type by the terminal device, refer to the method in Embodiment 1. Details are not described again in this application.

The terminal device may determine the resource of the PUCCH based on the carrier on which the PUCCH is located and the DCI by using any one of the following methods.

1. The terminal device obtains a K1 indication information set corresponding to the carrier on which the PUCCH is located. There is a correspondence between the plurality of carriers and K1 indication information sets. In other words, different carriers correspond to different K1 indication information sets. For example, a carrier 1 corresponds to a K1 indication information set 1, a carrier 2 corresponds to a K1 indication information set 2, and so on. Specifically, the terminal device may receive configuration information from the network device, where the configuration information indicates a K1 set corresponding to each carrier; and determines a time unit indicated by K1 in the K1 indication information set corresponding to the carrier on which the PUCCH is located as a time unit in which the PUCCH is located.

After determining, by using the foregoing method, the carrier on which the PUCCH is located, the terminal device may obtain a feedback duration set corresponding to the carrier. The DCI includes the K1 indication information. The terminal device determines, based on the K1 indication information, the time unit in which the PUCCH is located. For example, it is determined that the carrier on which the PUCCH is located is the carrier 1, and the K1 indication information set corresponding to the carrier 1 is determined. The DCI indicates a value of K1 in the K1 indication information set. For example, if the DCI is in a slot n, the time unit in which the PUCCH is located is a slot n+K1.

2. The terminal device obtains the PUCCH resource set corresponding to the carrier on which the PUCCH is located, where there is the correspondence between the plurality of carriers and the plurality of PUCCH resource sets; and determines a PUCCH resource that is indicated by a first indication value and that is in the PUCCH resource set corresponding to the carrier on which the PUCCH is located as the resource of the PUCCH.

The higher layer may configure the correspondence between the plurality of carriers and the plurality of PUCCH resource sets. In other words, different carriers correspond to different PUCCH resource sets. For example, a carrier 1 corresponds to a PUCCH resource set 1, and a carrier 2 corresponds to a PUCCH resource set 2. Specifically, the terminal device may receive configuration information from the network device, and the configuration information indicates a PUCCH resource set corresponding to each carrier. After determining, by using the foregoing method, the carrier on which the PUCCH is located, the terminal device may obtain the PUCCH resource set corresponding to the carrier. The DCI includes a first indication value, and the terminal device finds a corresponding PUCCH resource from a determined PUCCH resource set based on the first indication value.

Network device side: In a procedure in which the network device determines the resource of the uplink channel, the network device may first determine the carrier on which the PUCCH is located, and then determine the resource of the PUCCH based on the carrier on which the PUCCH is located. The PUCCH carries the feedback information corresponding to the PDSCH, and the PDSCH is scheduled by using the DCI carried on the PDCCH.

The network device may write the indication information to the DCI, to indicate the resource of the PUCCH. The DCI may include one or more of the second indication information, the K1 indication information, the resource of the PUCCH, and the first indication value. A function of the DCI is the same as that on the terminal device side. Details are not described herein again.

Alternatively, the network device may determine, by using the method 4 or 5 on the terminal device side, the carrier on which the PUCCH is located. A technical principle of the method on the network device side is similar to that of the method on the terminal device side. Details are not described herein again.

In this embodiment, the carrier on which the uplink channel is located may be dynamically determined, and the terminal device may choose, during each time of scheduling, to send the feedback information on a fastest available carrier, to reduce a service latency.

Embodiment 3

Terminal device side: After determining the resource of the uplink channel based on the DCI, the terminal device may send the uplink information on the resource of the uplink channel. When an SCS of the uplink channel is less than a first SCS, the uplink channel is sent on the resource of the uplink channel at the first SCS.

Corresponding to the scenario 1, the first SCS is an SCS of the PDCCH or an SCS of the PDSCH scheduled by using the DCI.

That is, in the scenario 1, when an SCS of the PUCCH is less than the SCS of the PDCCH or the SCS of the PDSCH, the uplink channel is sent on the PUCCH at the SCS of the PDCCH or the SCS of the PDSCH. For a determining manner of the SCS of the PUCCH, refer to a manner in a related technology. Alternatively, the carrier on which the PUCCH is located may be determined based on Embodiment 2, and an SCS corresponding to the carrier is the SCS of the PUCCH. For example, the SCS of the PUCCH is 15 kHz, and the SCS of the PDSCH is 60 kHz. This is equivalent to that a 60 kHz signal needs to be sent on a 15 kHz channel. In other words, a 60 kHz channel is sent on a 15 kHz carrier.

Corresponding to the scenario 2, the first SCS is an SCS of the PDCCH or an SCS of a CSI-RS, where the CSI-RS corresponds to the CSI triggered by the PDCCH.

That is, in the scenario 2, when an SCS of the PUCCH or an SCS of the PUSCH is less than the SCS of the PDCCH or the SCS of the CSI-RS, the uplink channel is sent on the PUCCH or the PUSCH at the SCS of the PDCCH or the SCS of the CSI-RS. For a determining manner of the SCS of the PUCCH, refer to a manner in a related technology. Alternatively, the carrier on which the PUCCH is located may be determined based on Embodiment 2, and an SCS corresponding to the carrier is the SCS of the PUCCH. The SCS of the PUSCH may be determined in the manner in the related technology. Details are not described again. For example, the SCS of the PUCCH or the SCS of the PUSCH is 15 kHz, and the SCS of the CSI-RS is 60 kHz. This is equivalent to that a 60 kHz signal needs to be sent on a 15 kHz channel. In other words, a 60 kHz channel is sent on a 15 kHz carrier.

Corresponding to the scenario 3, the first SCS is an SCS of the PDCCH.

That is, in the scenario 3, when an SCS of the PUSCH is less than the SCS of the PDCCH, the uplink channel is sent on the PUSCH at the SCS of the PDCCH. For a determining manner of the SCS of the PUSCH, refer to a manner in a related technology. For example, the SCS of the PUSCH is 15 kHz, and the SCS of the PDCCH is 60 kHz. This is equivalent to that a 60 kHz channel needs to be sent on a 15 kHz channel. In other words, a 60 kHz channel is sent on a 15 kHz carrier.

Figure 5:
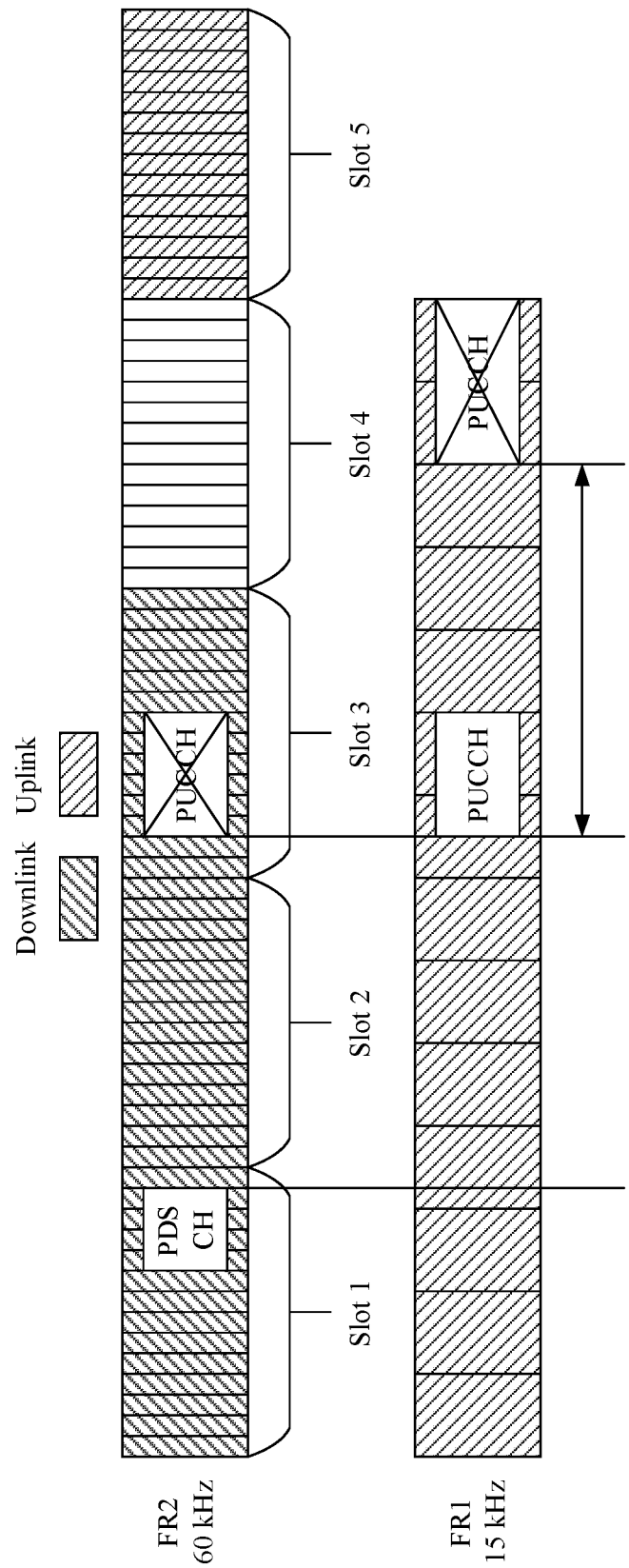
FIG. 5 is still another schematic diagram of a resource of an uplink channel for sending uplink information.

As shown in FIG. 5, CA is performed on FR1 and FR2. An SCS of FR1 is 15 kHz, and there is an FDD system. An SCS of FR2 is 60 kHz, and there is a TDD system. Assuming that symbol numbers in a slot are 0 to 13, a PDSCH is sent on symbols 9 to 12 in a slot 1 in FR2, and DCI configures a terminal device to send feedback information in FR1, processing duration of the terminal device is eight symbols, namely, symbols 12 and 13 in the slot 1, corresponding to 15 kHz. Assuming that the DCI configures the terminal device to send the feedback information in FR2, processing duration of the terminal device is 17 symbols, namely, symbols 2 to 7 in a slot 3, corresponding to 60 kHz. In terms of time, time for sending a PUCCH in FR1 is later than time for sending the PUCCH in FR2. In this application, uplink information may be sent on a resource of an uplink channel n FR1 on a carrier in FR2. That is, in FR1, the uplink information starts to be sent from a time point aligned with the symbol 2 in the slot 3 in FR2. This method may shorten a feedback latency.

Figure 6:
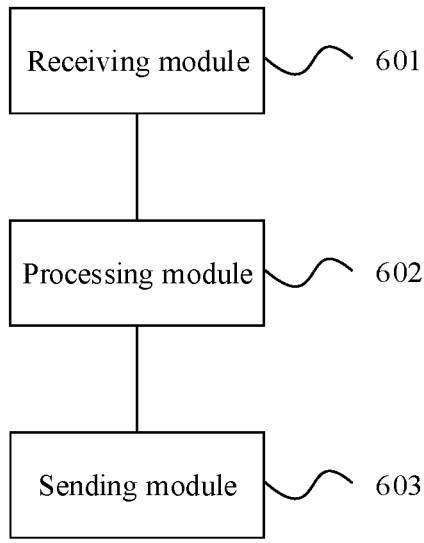
FIG. 6 is a schematic diagram of a structure of an embodiment of a communication apparatus according to this application.

FIG. 6 is a schematic diagram of a structure of an embodiment of a communication apparatus according to this application. As shown in FIG. 6, the apparatus in this embodiment may include a receiving module 601, a processing module 602, and a sending module 603.

When the communication apparatus is used in a terminal device, the receiving module 601 is configured to receive downlink control information DCI sent by a network device, where the DCI is carried on a physical downlink control channel PDCCH; and the processing module 602 is configured to determine a resource of an uplink channel based on the DCI, where the resource of the uplink channel is used to send uplink information.

In a possible implementation, the processing module 602 is further configured to determine first processing duration, where the first processing duration includes at least one time unit; and the sending module 603 is configured to: when feedback duration is greater than or equal to the first processing duration, send the uplink information on the resource of the uplink channel, where the feedback duration is a time length between the resource of the uplink channel and a resource of a downlink channel corresponding to the uplink channel, and the downlink channel includes the PDCCH or a physical downlink shared channel PDSCH scheduled by using the DCI.

In a possible implementation, the processing module 602 is specifically configured to: obtain at least one subcarrier spacing SCS and processing duration respectively corresponding to the at least one SCS, where the at least one SCS includes an SCS of the PDCCH and an SCS of the uplink channel; and determine shortest duration in the processing duration respectively corresponding to the at least one SCS as the first processing duration.

In a possible implementation, the at least one SCS further includes an SCS of the PDSCH scheduled by using the DCI, the uplink channel is a physical uplink control channel PUCCH, and the PUCCH carries feedback information corresponding to the PDSCH.

In a possible implementation, the at least one SCS further includes an SCS of a channel state information-reference signal CSI-RS, the uplink channel is a PUCCH or a PUSCH, the PUCCH or the PUSCH carries channel state information CSI corresponding to the CSI-RS, and the CSI is triggered by the DCI.

In a possible implementation, the uplink channel is a PUSCH scheduled by using the PDCCH.

In a possible implementation, the processing module 602 is specifically configured to: obtain an SCS of the PDSCH scheduled by using the DCI and processing duration corresponding to the SCS of the PDSCH, where the PDSCH corresponds to the uplink channel, the uplink channel is a PUCCH, and the PUCCH carries feedback information corresponding to the PDSCH; and determine the processing duration corresponding to the SCS of the PDSCH as the first processing duration.

In a possible implementation, the processing module 602 is specifically configured to: obtain an SCS of a CSI-RS and processing duration corresponding to the SCS of the CSI-RS, where the CSI-RS corresponds to the uplink channel, the uplink channel is a PUCCH or a PUSCH, the PUCCH or the PUSCH carries CSI corresponding to the CSI-RS, and the CSI is triggered by the DCI; and determine the processing duration corresponding to the SCS of the CSI-RS as the first processing duration.

In a possible implementation, the processing module 602 is further configured to: determine whether a first condition is satisfied; and when the first condition is satisfied, determine the first processing duration, where the first condition includes: a current service is a URLLC service; or a value of first indication information is a specified value.

In a possible implementation, the uplink channel is a PUCCH, and the PUCCH carries feedback information corresponding to a PDSCH scheduled by using the DCI. The processing module 602 is specifically configured to: determine a carrier on which the PUCCH is located; and determine a resource of the PUCCH based on the carrier on which the PUCCH is located and the DCI.

In a possible implementation, the processing module 602 is specifically configured to: when the DCI includes second indication information, determine a carrier corresponding to a value of the second indication information as the carrier on which the PUCCH is located; when the DCI includes feedback duration, if a time unit that is indicated by the feedback duration and that is of the feedback information corresponding to the PDSCH includes a downlink symbol, determine a default carrier as the carrier on which the PUCCH is located; when the DCI includes the resource of the PUCCH, determine a carrier of the resource of the PUCCH as the carrier on which the PUCCH is located; determine, based on a bit quantity of the feedback information, the carrier on which the PUCCH is located, where there is a correspondence between a plurality of bit quantities of the feedback information and a plurality of PUCCH resource sets, and there is a correspondence between the plurality of PUCCH resource sets and a plurality of carriers; or determine, based on a service type of the PDSCH, the carrier on which the PUCCH is located, where there is a correspondence between a plurality of service types of the PDSCH and a plurality of carriers.

In a possible implementation, the processing module 602 is specifically configured to: obtain a feedback duration set corresponding to the carrier on which the PUCCH is located, where there is a correspondence between the plurality of carriers and a plurality of feedback duration sets; and determine a time unit indicated by first feedback duration in the feedback duration set corresponding to the carrier on which the PUCCH is located as a time unit in which the PUCCH is located, where the first feedback duration is included in the DCI.

In a possible implementation, the processing module 602 is specifically configured to: obtain a PUCCH resource set corresponding to the carrier on which the PUCCH is located, where there is the correspondence between the plurality of carriers and the plurality of PUCCH resource sets; and determine a PUCCH resource that is indicated by a first indication value and that is in the PUCCH resource set corresponding to the carrier on which the PUCCH is located as the resource of the PUCCH, where the first indication value is included in the DCI.

In a possible implementation, the sending module 603 is further configured to send the uplink information on the resource of the uplink channel.

In a possible implementation, the sending module 603 is specifically configured to: when an SCS of the uplink channel is less than a first SCS, send the uplink channel on the resource of the uplink channel at the first SCS.

In a possible implementation, the first SCS is an SCS of the PDCCH or an SCS of the PDSCH scheduled by using the DCI; the first SCS is an SCS of the PDCCH or an SCS of a CSI-RS, where the CSI-RS corresponds to CSI triggered by the PDCCH; or the first SCS is an SCS of the PDCCH.

When the communication apparatus is used in a network device, the processing module 602 is configured to determine a resource of an uplink channel, where the resource of the uplink channel is used to receive uplink information; and the sending module 603 is configured to send downlink control information DCI to a terminal device, where the DCI is carried on a physical downlink control channel PDCCH, and the DCI is used to indicate the resource of the uplink channel.

In a possible implementation, the processing module 602 is further configured to determine first processing duration, where the first processing duration includes at least one time unit; and the receiving module 601 is configured to: when feedback duration is greater than or equal to the first processing duration, receive the uplink information on the resource of the uplink channel, where the feedback duration is a time length between the resource of the uplink channel and a resource of a downlink channel corresponding to the uplink channel, and the downlink channel includes the PDCCH or a physical downlink shared channel PDSCH scheduled by using the DCI.

In a possible implementation, the processing module 602 is specifically configured to: obtain at least one subcarrier spacing SCS and processing duration respectively corresponding to the at least one SCS, where the at least one SCS includes an SCS of the PDCCH and an SCS of the uplink channel; and determine shortest duration in the processing duration respectively corresponding to the at least one SCS as the first processing duration.

In a possible implementation, the at least one SCS further includes an SCS of the PDSCH scheduled by using the DCI, the uplink channel is a physical uplink control channel PUCCH, and the PUCCH carries feedback information corresponding to the PDSCH.

In a possible implementation, the at least one SCS further includes an SCS of a channel state information-reference signal CSI-RS, the uplink channel is a PUCCH or a PUSCH, the PUCCH or the PUSCH carries channel state information CSI corresponding to the CSI-RS, and the CSI is triggered by the DCI.

In a possible implementation, the uplink channel is a PUSCH scheduled by using the PDCCH.

In a possible implementation, the processing module 602 is specifically configured to: obtain an SCS of the PDSCH scheduled by using the DCI and processing duration corresponding to the SCS of the PDSCH, where the PDSCH corresponds to the uplink channel, the uplink channel is a PUCCH, and the PUCCH carries feedback information corresponding to the PDSCH; and determine the processing duration corresponding to the SCS of the PDSCH as the first processing duration.

In a possible implementation, the processing module 602 is specifically configured to: obtain an SCS of a CSI-RS and processing duration corresponding to the SCS of the CSI-RS, where the CSI-RS corresponds to the uplink channel, the uplink channel is a PUCCH or a PUSCH, the PUCCH or the PUSCH carries CSI corresponding to the CSI-RS, and the CSI is triggered by the DCI; and determine the processing duration corresponding to the SCS of the CSI-RS as the first processing duration.

In a possible implementation, the processing module 602 is further configured to: determine whether a first condition is satisfied; and when the first condition is satisfied, determine the first processing duration, where the first condition includes: a current service is a URLLC service; or a value of first indication information is a specified value.

In a possible implementation, the uplink channel is a PUCCH, and the PUCCH carries feedback information corresponding to a PDSCH scheduled by using the DCI. The processing module 602 is specifically configured to determine a carrier on which the PUCCH is located; and determine a resource of the PUCCH based on the carrier on which the PUCCH is located.

In a possible implementation, when the DCI includes second indication information, a carrier corresponding to a value of the second indication information is the carrier on which the PUCCH is located; when the DCI includes feedback duration, if a time unit that is indicated by the feedback duration and that is of the feedback information corresponding to the PDSCH includes a downlink symbol, a default carrier is the carrier on which the PUCCH is located, where the feedback duration is a time length between the resource of the PUCCH and a resource of the PDSCH; or when the DCI includes the resource of the PUCCH, a carrier of the resource of the PUCCH is the carrier on which the PUCCH is located.

In a possible implementation, the processing module 602 is specifically configured to: determine, based on a bit quantity of the feedback information, the carrier on which the PUCCH is located, where there is a correspondence between a plurality of bit quantities of the feedback information and a plurality of PUCCH resource sets, and there is a correspondence between the plurality of PUCCH resource sets and a plurality of carriers; or determine, based on a service type of the PDSCH, the carrier on which the PUCCH is located, where there is a correspondence between a plurality of service types of the PDSCH and a plurality of carriers.

In a possible implementation, the DCI includes the feedback duration, and a time unit indicated by the feedback duration in a feedback duration set corresponding to the carrier on which the PUCCH is located is a time unit in which the PUCCH is located, and there is a correspondence between the plurality of carriers and a plurality of feedback duration sets.

In a possible implementation, the DCI includes a first indication value, and a PUCCH resource that is indicated by the first indication value and that is in a PUCCH resource set corresponding to the carrier on which the PUCCH is located is the resource of the PUCCH, and there is the correspondence between the plurality of carriers and the plurality of PUCCH resource sets.

In a possible implementation, the receiving module 601 is further configured to receive the uplink information on the resource of the uplink channel.

In a possible implementation, the receiving module 601 is specifically configured to: when an SCS of the uplink channel is less than a first SCS, receive the uplink channel on the resource of the uplink channel at the first SCS.

In a possible implementation, the first SCS is an SCS of the PDCCH or an SCS of the PDSCH scheduled by using the DCI; the first SCS is an SCS of the PDCCH or an SCS of a CSI-RS, where the CSI-RS corresponds to CSI triggered by the PDCCH; or the first SCS is an SCS of the PDCCH.

The apparatus in this embodiment may be configured to perform the technical solutions in the method embodiment shown in FIG. 4 or FIG. 5, and the implementation principle and the technical effect of the apparatus are similar to those of the method embodiment, and are not described herein again.

Figure 7:
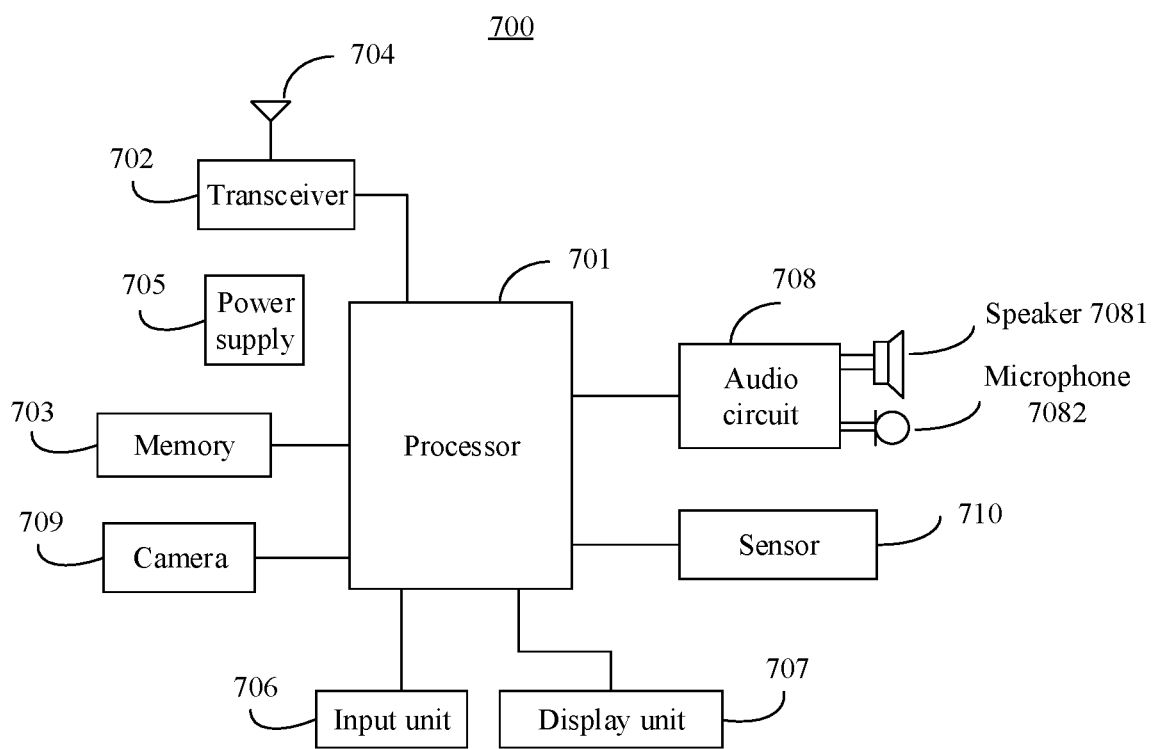
FIG. 7 is a schematic diagram of a structure of a terminal device according to this application.

FIG. 7 is a schematic diagram of a structure of a terminal device according to this application. As shown in FIG. 7, the terminal device 700 includes a processor 701 and a transceiver 702.

Optionally, the terminal device 700 further includes a memory 703. The processor 701, the transceiver 702, and the memory 703 may communicate with each other through an internal connection path, to transfer a control signal and/or a data signal.

The memory 703 is configured to store a computer program. The processor 701 is configured to execute the computer program stored in the memory 703, to implement the functions of the communication apparatus in the foregoing apparatus embodiment.

Optionally, the memory 703 may be integrated into the processor 701, or may be independent of the processor 701.

Optionally, the terminal device 700 may further include an antenna 704, configured to transmit a signal output by the transceiver 702. Alternatively, the transceiver 702 receives a signal through the antenna.

Optionally, the terminal device 700 may further include a power supply 705, configured to supply power to various components or circuits in the terminal device.

In addition, to improve the functions of the terminal device, the terminal device 700 may further include one or more of an input unit 706, a display unit 707 (which may alternatively be considered as an output unit), an audio circuit 708, a camera 709, a sensor 710, and the like. The audio circuit may further include a speaker 7081, a microphone 7082, and the like. Details are not described again.

Figure 8:
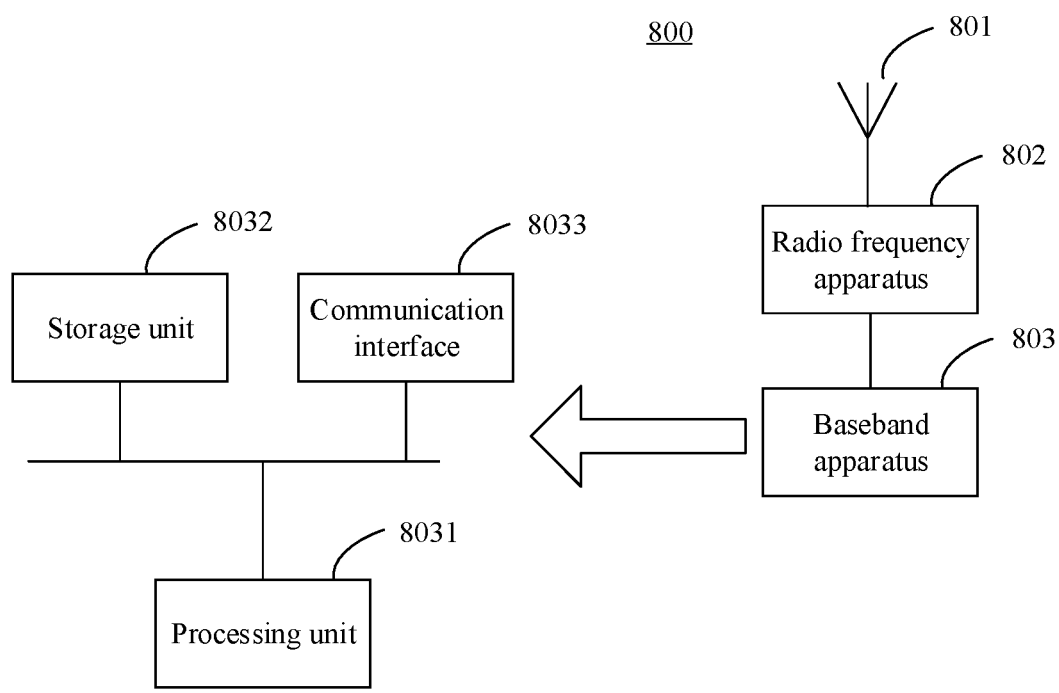
FIG. 8 is a schematic diagram of a structure of a network device according to this application.

FIG. 8 is a schematic diagram of a structure of a network device according to this application. As shown in FIG. 8, the network device 800 includes an antenna 801, a radio frequency apparatus 802, and a baseband apparatus 803. The antenna 801 is connected to the radio frequency apparatus 802. In an uplink direction, the radio frequency apparatus 802 receives a signal from a terminal device through the antenna 801, and sends the received signal to the baseband apparatus 803 for processing. In a downlink direction, the baseband apparatus 803 generates a signal that needs to be sent to the terminal device, and sends the generated signal to the radio frequency apparatus 802. The radio frequency apparatus 802 transmits the signal through the antenna 801.

The baseband apparatus 803 may include one or more processing units 8031. The processing unit 8031 may be specifically a processor.

In addition, the baseband apparatus 803 may further include one or more storage units 8032 and one or more communication interfaces 8033. The storage unit 8032 is configured to store a computer program and/or data. The communication interface 8033 is configured to exchange information with the radio frequency apparatus 802. The storage unit 8032 may be specifically a memory, and the communication interface 8033 may be an input/output interface or a transceiver circuit.

Optionally, the storage unit 8032 may be a storage unit located on a same chip as the processing unit 8031, that is, the storage unit is an on-chip storage unit, or may be a storage unit located on a different chip from the processing unit 8031, that is, the storage unit is an off-chip storage unit. This is not limited in this application.

In an implementation procedure, steps in the foregoing method embodiments may be completed by using an integrated logic circuit of hardware in the processor or instructions in a form of software. The processor may be a general purpose processor, a digital signal processor (DSP), an application-specific integrated circuit (ASIC), a field programmable gate array (FPGA) or another programmable logic device, a discrete gate or a transistor logic device, or a discrete hardware component. The general purpose processor may be a microprocessor, or the processor may be any conventional processor or the like. The steps of the methods disclosed in embodiments of this application may be directly executed and completed by using a hardware encoding processor, or may be executed and completed by using a combination of hardware and software modules in the encoding processor. The software module may be located in a mature storage medium in the art, for example, a random access memory, a flash memory, a read-only memory, a programmable read-only memory, an electrically erasable programmable memory, and a register. The storage medium is located in the memory, and the processor reads information in the memory and completes the steps in the foregoing methods in combination with hardware of the processor.

The memory in the foregoing embodiments may be a volatile memory or a non-volatile memory, or may include both the volatile memory and the non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. By way of example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DR RAM). It should be noted that memories in the system and method described in this specification are intended to include but are not limited to the memories and memories of any other proper types.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working procedure of the foregoing system, apparatus, and unit, refer to a corresponding procedure in the foregoing method embodiments. Details are not described herein again.

In the several embodiments provided in this application, it should be understood that the disclosed system, apparatus, and method may be implemented in other manners. For example, the foregoing apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electrical form, a mechanical form, or another form.

The units described as separate parts may or may not be physically separate, and parts displayed as units may or may not be physical units, in other words, may be located in one location, or may be distributed on a plurality of network units. Some or all of the units may be selected based on actual requirements to achieve the objectives of the solutions of the embodiments.

In addition, the functional units in embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in the form of a software product. The computer software product is stored in a storage medium and includes several instructions for instructing a computer device (a personal computer, a server, or a network device) to perform all or some of the steps of the methods in embodiments of this application. The foregoing storage medium includes various media that can store program code, such as a USB flash disk, a removable hard disk, a read-only memory (ROM), a random access memory (RAM), a magnetic disk, or a compact disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:
1. A resource determining method, comprising:
receiving downlink control information (DCI) from a network device, wherein the DCI is carried on a physical downlink control channel (PDCCH); and determining a resource of an uplink channel based on the DCI, wherein the resource of the uplink channel is used to send uplink information;

wherein the uplink channel is a physical uplink control channel (PUCCH), and the PUCCH carries feedback information corresponding to a physical downlink shared channel (PDSCH) scheduled by using the DCI;

wherein the determining the resource of the uplink channel based on the DCI comprises:
  determining a carrier on which the PUCCH is located; and
  determining a resource of the PUCCH based on the carrier on which the PUCCH is located and the DCI; and wherein the determining the resource of the PUCCH based on the carrier on which the PUCCH is located and the DCI comprises:
  obtaining a feedback duration set corresponding to the carrier on which the PUCCH is located, wherein there is a correspondence between a plurality of carriers and a plurality of feedback duration sets; and
  determining a time unit indicated by first feedback duration in the feedback duration set corresponding to the carrier on which the PUCCH is located as a time unit in which the PUCCH is located, wherein the first feedback duration is comprised in the DCI.

2. The method according to claim 1, wherein the determining the carrier on which the PUCCH is located comprises:
  in response to the DCI comprising second indication information, determining a carrier corresponding to a value of the second indication information as the carrier on which the PUCCH is located.

3. The method according to claim 1, wherein after the determining the resource of the uplink channel based on the DCI, the method further comprises:
  sending the uplink information on the resource of the uplink channel.

4. A resource determining method, comprising:
  determining a resource of an uplink channel, wherein the resource of the uplink channel is used to receive uplink information; and
  sending downlink control information (DCI) to a terminal device, wherein the DCI is carried on a physical downlink control channel (PDCCH), and the DCI is used to indicate the resource of the uplink channel;

wherein the uplink channel is a physical uplink control channel (PUCCH), and the PUCCH carries feedback information corresponding to a physical downlink shared channel (PDSCH) scheduled by using the DCI;

wherein the determining a resource of an uplink channel comprises:
  determining a carrier on which the PUCCH is located; and
  determining a resource of the PUCCH based on the carrier on which the PUCCH is located; and wherein the DCI comprises a feedback duration, and a time unit indicated by the feedback duration in a feedback duration set corresponding to the carrier on which the PUCCH is located is a time unit in which the PUCCH is located, and there is a correspondence between a plurality of carriers and a plurality of feedback duration sets.

5. The method according to claim 4, wherein in response to the DCI comprising second indication information, determining a carrier corresponding to a value of the second indication information as the carrier on which the PUCCH is located.

6. The method according to claim 4, wherein after the sending DCI to the terminal device, the method further comprises:
  receiving the uplink information on the resource of the uplink channel.

7. A communication apparatus, comprising:
  a receiver, configured to receive downlink control information (DCI) from a network device, wherein the DCI is carried on a physical downlink control channel (PDCCH); and
  a processor, configured to determine a resource of an uplink channel based on the DCI, wherein the resource of the uplink channel is used to send uplink information;

wherein the uplink channel is a physical uplink control channel (PUCCH), and the PUCCH carries feedback information corresponding to a physical downlink shared channel (PDSCH) scheduled by using the DCI;

wherein the processor is further configured to:
  determine a carrier on which the PUCCH is located; and
  determine a resource of the PUCCH based on the carrier on which the PUCCH is located and the DCI; and wherein determining the resource of the PUCCH based on the carrier on which the PUCCH is located and the DCI comprises:
  obtaining a feedback duration set corresponding to the carrier on which the PUCCH is located, wherein there is a correspondence between a plurality of carriers and a plurality of feedback duration sets; and
  determining a time unit indicated by first feedback duration in the feedback duration set corresponding to the carrier on which the PUCCH is located as a time unit in which the PUCCH is located, wherein the first feedback duration is comprised in the DCI.

8. The apparatus according to apparatus 7, wherein determining the carrier on which the PUCCH is located comprises:
  in response to the DCI comprising second indication information, determining a carrier corresponding to a value of the second indication information as the carrier on which the PUCCH is located.

9. A communication apparatus, comprising:
  a processor, configured to determine a resource of an uplink channel, wherein the resource of the uplink channel is used to receive uplink information; and
  a transmitter, configured to send downlink control information (DCI) to a terminal device, wherein the DCI is carried on a physical downlink control channel (PDCCH), and the DCI is used to indicate the resource of the uplink channel;

wherein the uplink channel is a physical uplink control channel (PUCCH), and the PUCCH carries feedback information corresponding to a physical downlink shared channel (PDSCH) scheduled by using the DCI;

wherein the processor is further configured to:
  determine a carrier on which the PUCCH is located; and
  determine a resource of the PUCCH based on the carrier on which the PUCCH is located; and wherein the DCI comprises a feedback duration, and a time unit indicated by the feedback duration in a feedback duration set corresponding to the carrier on which the PUCCH is located is a time unit in which the PUCCH is located, and there is a correspondence between a plurality of carriers and a plurality of feedback duration sets.

10. The apparatus according to claim 9, wherein the processor is further configured to:
   in response to the DCI comprising second indication information, determine a carrier corresponding to a value of the second indication information as the carrier on which the PUCCH is located.

* * * * *